United States Patent
McAllister et al.

(10) Patent No.: US 12,420,876 B2
(45) Date of Patent: Sep. 23, 2025

(54) DEPLOYABLE DIFFUSER

(71) Applicant: Rivian IP Holdings, LLC, Irvine, CA (US)

(72) Inventors: Andrew McAllister, Newport Coast, CA (US); Zackery Patrick Borton, Howell, MI (US); Jeremy Green, Wiltshire (GB); Veselin Angelov, West Midlands (GB)

(73) Assignee: Rivian IP Holdings, LLC

( * ) Notice: Subject to any disclaimer, the term of this patent is extended or adjusted under 35 U.S.C. 154(b) by 741 days.

(21) Appl. No.: 17/746,084

(22) Filed: May 17, 2022

(65) Prior Publication Data
US 2023/0373573 A1  Nov. 23, 2023

(51) Int. Cl.
*B62D 35/00* (2006.01)
*B62D 35/02* (2006.01)

(52) U.S. Cl.
CPC ........... *B62D 35/007* (2013.01); *B62D 35/02* (2013.01)

(58) Field of Classification Search
CPC ...... B62D 35/00; B62D 35/007; B62D 35/02; B62D 37/02
USPC ................................ 296/180.1, 180.2, 180.3
See application file for complete search history.

(56) References Cited

U.S. PATENT DOCUMENTS

| | | | |
|---|---|---|---|
| 9,527,535 B1 * | 12/2016 | Cha | B60R 19/48 |
| 10,040,492 B2 * | 8/2018 | Cha | B62D 35/007 |
| 10,040,493 B2 * | 8/2018 | Wolf | F15D 1/007 |
| 10,266,214 B2 * | 4/2019 | Cha | B62D 37/02 |
| 10,300,966 B2 * | 5/2019 | Cha | B62D 35/007 |
| 10,604,197 B2 * | 3/2020 | Bray | G05B 15/02 |
| 11,560,185 B2 * | 1/2023 | Kelly | B62D 37/02 |
| 11,772,722 B2 * | 10/2023 | Iorga | B62D 35/02 296/180.5 |
| 2020/0385070 A1 * | 12/2020 | Cattell | B62D 37/02 |

FOREIGN PATENT DOCUMENTS

| | | | | |
|---|---|---|---|---|
| EP | 3792162 A1 * | 3/2021 | | B62D 35/007 |
| FR | 2856974 A1 * | 1/2005 | | B62D 35/007 |

OTHER PUBLICATIONS https://www.youtube.com/watch?v=x_XV0bVYB3w&ab_channel=AutoMedia.

* cited by examiner

*Primary Examiner* — Jason S Daniels
(74) *Attorney, Agent, or Firm* — FOLEY & LARDNER LLP

(57) ABSTRACT

The system can include a diffuser disposed at a rear of a vehicle. A side of the diffuser can be positioned to face the earth. The system can include an actuator coupled with the diffuser and configured to deploy the diffuser to adjust drag on the vehicle. The system can include a sensor configured to detect an obstacle. The system can include one or more processors that are in communication with the sensor and the actuator. The one or more processors can be configured to identify a mode of operation of the vehicle. The one or more processors can be configured to determine, based on input from the sensor and the mode of operation, a position to which to move the diffuser. The one or more processors can be configured to transmit a command to the actuator to move the diffuser to the position.

18 Claims, 10 Drawing Sheets

DEPLOYABLE DIFFUSER

SUMMARY

This technology is directed to providing a deployable diffuser to improve aerodynamics of a vehicle. The diffuser can reduce drag on the vehicle as the vehicle is traveling. Reducing drag on the vehicle can reduce energy consumption of the vehicle, thereby improving efficiency. The deployable diffuser of this vehicle can move to different positions based on the mode of operation of the vehicle. For example, the diffuser can be deployed to reduce drag when the vehicle is moving at highway speeds (e.g., 55 miles per hour). The diffuser can be stowed when the vehicle is in an off-road mode to prevent the diffuser from hitting obstacles, such as rocks or uneven ground surfaces, thereby preventing damage to the vehicle.

At least one aspect is directed to a system. The system can include a diffuser disposed at a rear portion of a vehicle. A side of the diffuser can be positioned to face a surface on earth located under the vehicle. The system can include an actuator coupled with the diffuser. The actuator can be configured to deploy the diffuser from a first position to a second position to adjust drag on the vehicle. The system can include a sensor configured to detect an obstacle for the diffuser. The system can include one or more processors that are in communication with the sensor and the actuator. The one or more processors can be configured to identify a mode of operation of the vehicle. The one or more processors can be configured to determine, based on input from the sensor and the mode of operation, a position to which to move the diffuser. The one or more processors can be configured to transmit a command to the actuator to cause the actuator to move the diffuser to the position determined based on the input from the sensor and the mode of operation of the vehicle.

At least one aspect is directed to a method. The method can include identifying, by one or more processors, a mode of operation of a vehicle. The vehicle can include a diffuser disposed at a rear portion of the vehicle. A side of the diffuser can be positioned to face a surface on earth located under the vehicle. The method can include determining, by the one or more processors, a position to which to move the diffuser. The position can be based on input from a sensor and the mode of operation. The sensor can be configured to detect an obstacle for the diffuser. The method can include transmitting, by the one or more processors, a command to an actuator to cause the actuator to move the diffuser to the position based on the input from the sensor and the mode of operation of the vehicle.

At least one aspect is directed to an electric vehicle. The electric vehicle can include a diffuser disposed at a rear portion of the electric vehicle. A side of the diffuser can be positioned to face a surface on earth located under the electric vehicle. The electric vehicle can include an actuator coupled with the diffuser. The actuator can be configured to deploy the diffuser from a first position to a second position to adjust drag on the vehicle. The electric vehicle can include a sensor configured to detect an obstacle for the diffuser. The electric vehicle can include one or more processors in communication with the sensor and the actuator. The one or more processors can be configured to identify a mode of operation of the electric vehicle. The one or more processors can be configured to determine, based on input from the sensor and the mode of operation, a position to which to move the diffuser. The one or more processors can be configured to transmit a command to the actuator to cause the actuator to move the diffuser to the position determined based on the input from the sensor and the mode of operation of the electric vehicle.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
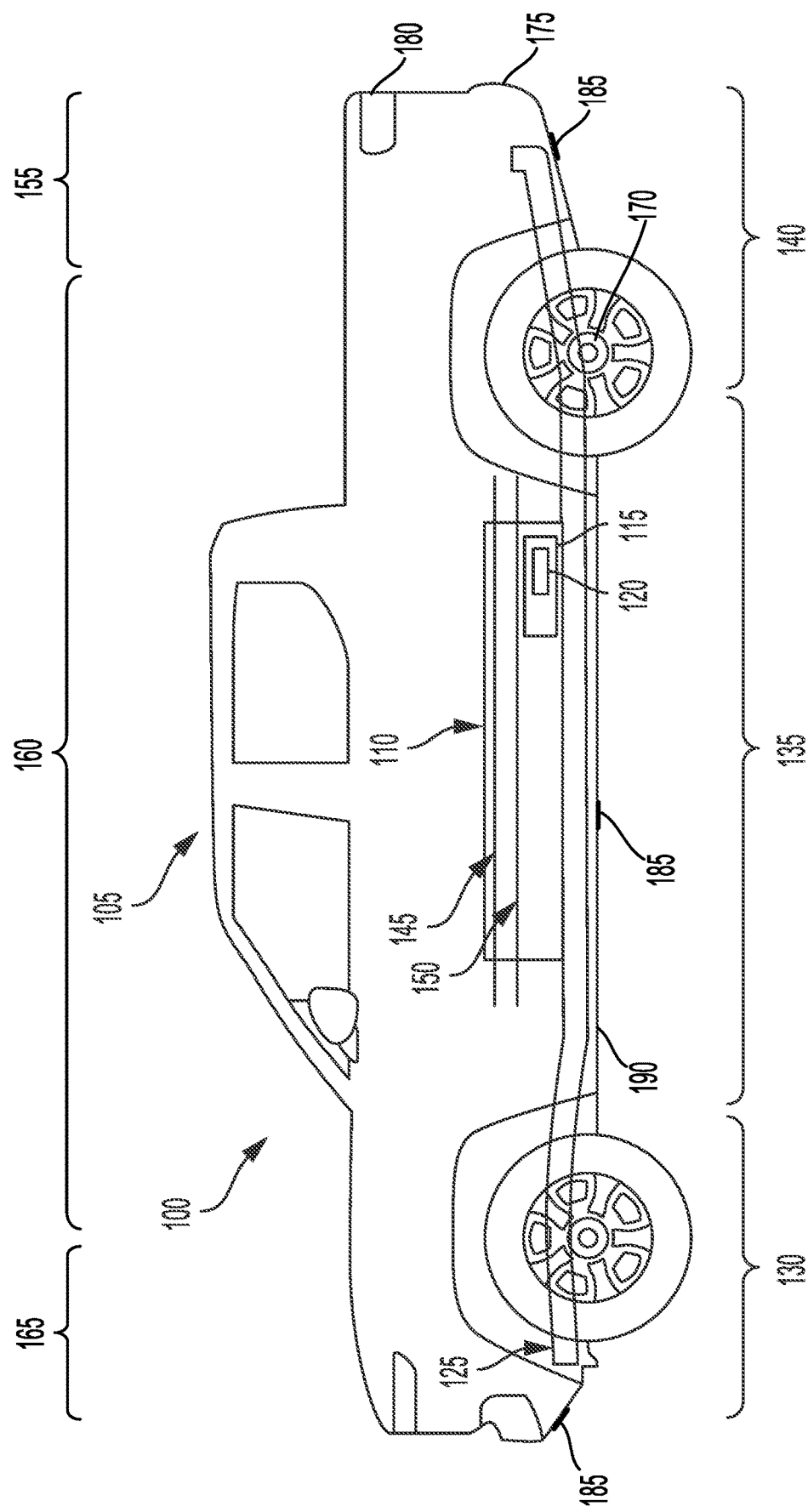
FIG. 1 depicts an example vehicle, in accordance with some aspects.

Following below are more detailed descriptions of various concepts related to, and implementations of, methods, apparatuses, and systems of the deployable diffuser. The various concepts introduced above and discussed in greater detail below may be implemented in any of numerous ways.

This disclosure is directed to systems and methods of deploying a diffuser of a vehicle. For example, systems and methods of this disclosure are directed to a deployable diffuser located at a rear bumper of a vehicle that can move to different positions based on various inputs or conditions. When deployed, the diffuser can reduce drag on the vehicle, thereby improving vehicle aerodynamics. The diffuser can then be retracted into the vehicle to provide sufficient clearance from obstacles or blockages during off-roading. Thus, the position of the diffuser is adjustable to accommodate both road travel and off-road travel. For road travel, the diffuser can reduce the drag on the vehicle when disposed at an angle away from the vehicle. For off-road travel, the diffuser can be retracted and stowed such that it is out of the way and provides the vehicle with a desired departure angle that facilitates off-road activities. The diffuser can be moveably coupled with the vehicle such that it can pivot away from the vehicle when drag reductions are desired and can pivot toward the vehicle when a large departure angle is desired.

Various inputs received by one or more processors of the vehicle can determine the desired position of the diffuser. For example, the position of the diffuser can be based on a manual command, a mode of operation of the vehicle (e.g., a, off-roading vehicle mode, a vehicle speed, a vehicle ride height, a vehicle configuration, etc.), and an input received from a sensor, among others. The position of the diffuser can be predetermined for any combination of inputs. There can be a plurality of predetermined angles to which the diffuser can move based on the inputs. The plurality of predetermined angles can be updated automatically, remotely, manually, or by any combination thereof. For example, the vehicle can fine tune the positions on an on-going basis by monitoring the performance using a baseline angle (e.g., a default or initial angle established for the vehicle or in a lookup table) at a predetermined speed (e.g., at a freeway speed), and then slightly change the angle of the diffuser while keeping other variables constant to measure any changes in the performance of the vehicle. The vehicle can generate or update a lookup table of diffuser angles based on this tuning process, and provide the data to a central server for further processing or aggregation. The updated lookup table can be used to determine a position of the diffuser from a plurality of positions.

The systems and methods of this technical solution have a technical advantage of reducing drag on a vehicle while still allowing the vehicle to perform off-roading activities. The disclosed solutions monitor the state and performance of the vehicle to determine when a diffuser can be deployed, while also monitoring the environment to verify that the surrounding conditions are conducive to a deployed diffuser. The systems disclosed herein can monitor, control, and manage the positions of the diffuser based on a variety of inputs, adjust the position of the diffuser automatically, and update performance parameters based on real performance data.

FIG. 1 depicts an example cross-sectional view 100 of an electric vehicle 105 installed with at least one battery pack 110. Electric vehicles 105 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 110 can also be used as an energy storage system to power a building, such as a residential home or commercial building. Electric vehicles 105 can be fully electric or partially electric (e.g., plug-in hybrid) and further, electric vehicles 105 can be fully autonomous, partially autonomous, or unmanned. Electric vehicles 105 can also be human operated or non-autonomous. Electric vehicles 105 such as electric trucks or automobiles can include on-board battery packs 110, battery modules 115, or battery cells 120 to power the electric vehicles. The electric vehicle 105 can include a chassis 125 (e.g., a frame, internal frame, or support structure). The chassis 125 can support various components of the electric vehicle 105. The chassis 125 can span a front portion 130 (e.g., a hood or bonnet portion), a body portion 135, and a rear portion 140 (e.g., a trunk, payload, or boot portion) of the electric vehicle 105. The battery pack 110 can be installed or placed within the electric vehicle 105. For example, the battery pack 110 can be installed on the chassis 125 of the electric vehicle 105 within one or more of the front portion 130, the body portion 135, or the rear portion 140. The battery pack 110 can include or connect with at least one busbar, e.g., a current collector element. For example, the first busbar 145 and the second busbar 150 can include electrically conductive material to connect or otherwise electrically couple the battery modules 115 or the battery cells 120 with other electrical components of the electric vehicle 105 to provide electrical power to various systems or components of the electric vehicle 105.

Vehicle 105 can include a front section 155, a middle section 160, and a rear section 165. The sections 155, 160, 165 of the vehicle 105 can coincide with the portions 130, 135, 140 of the chassis 125. For example, the rear portion 140 of the chassis 125 can include the same or similar area of the vehicle 105 as the rear portion 165 of the vehicle 105. In other examples, the sections 155, 160, 165 of the vehicle 105 can refer to different areas than the corresponding portions 130, 135, 140 of the chassis 125. For example, the rear portion 140 of the chassis 125 may include one or more components from a rear axle 170 of the vehicle 105 to a tip of a rear bumper 175, and a rear section 165 of the vehicle 105 can include the area of the vehicle 105 comprising the rear bumper 175 and a light, shown as tail light 180.

Vehicle 105 can include at least one detection device, shown as sensor 185. The sensor 185 can be disposed at any location of the vehicle 105. For example, the sensor 185 can be disposed on a bottom 190 of the vehicle 105. The sensor 185 can be disposed on at least one of the front section 155, the middle section 160, and the rear section 165. The vehicle 105 can include a plurality of sensors 185. For example, a first sensor 185 can be disposed on the front section 155 and a second sensor 185 can be disposed on the rear section 165. Sensor 185 can also be disposed in front of, on top of, or behind the vehicle 105. The sensor 185 can be configured to detect an obstacle or a potential obstacle. The obstacle can be any object or structure over which or into which the vehicle 105 is projected to travel. The sensor 185 can be any form of object detection sensor. The vehicle 105 can include any number and any combination of sensors 185. Upon detection of an obstacle, the sensor 185 can transmit a signal indicative of the obstacle. The signal can include obstacle data including but not limited to, distance away (e.g., distance from diffuser 205, etc.), size of obstacle, obstacle identity (e.g., boulder, fallen tree, pot hole, speed bump, etc.).

The sensor 185 can also detect a surrounding area of the vehicle 105. For example, the sensor 185 can detect a terrain over which the vehicle 105 is traveling. For example, the sensor 185 can detect when the vehicle 105 is traveling on rocky terrain, uneven terrain, unpaved terrain, off-road terrain, wet terrain, muddy terrain, or any other type of terrain. Detection of the surrounding area can include detection of obstacles or potential obstacles. The sensor 185 can detect objects, humidity, temperature, vibrations, changes in formations, among other variables, to determine the terrain. For example, the sensor 185 can detect a high level of vibrations indicating that the terrain is rocky. The sensor 185 can also be a GPS and detect a location of the vehicle 105 to detect the terrain. For example, the location of the vehicle 105 can be previously established as a common off-roading site. The surrounding area can, for example, include terrain within 300 feet of the sensor 185. Upon detection of the surrounding area, the sensor 185 can transmit a signal indicative of the surrounding area. The signal can include surrounding area data or terrain data including but not limited to, type of terrain and size of surrounding area.

Figure 2:
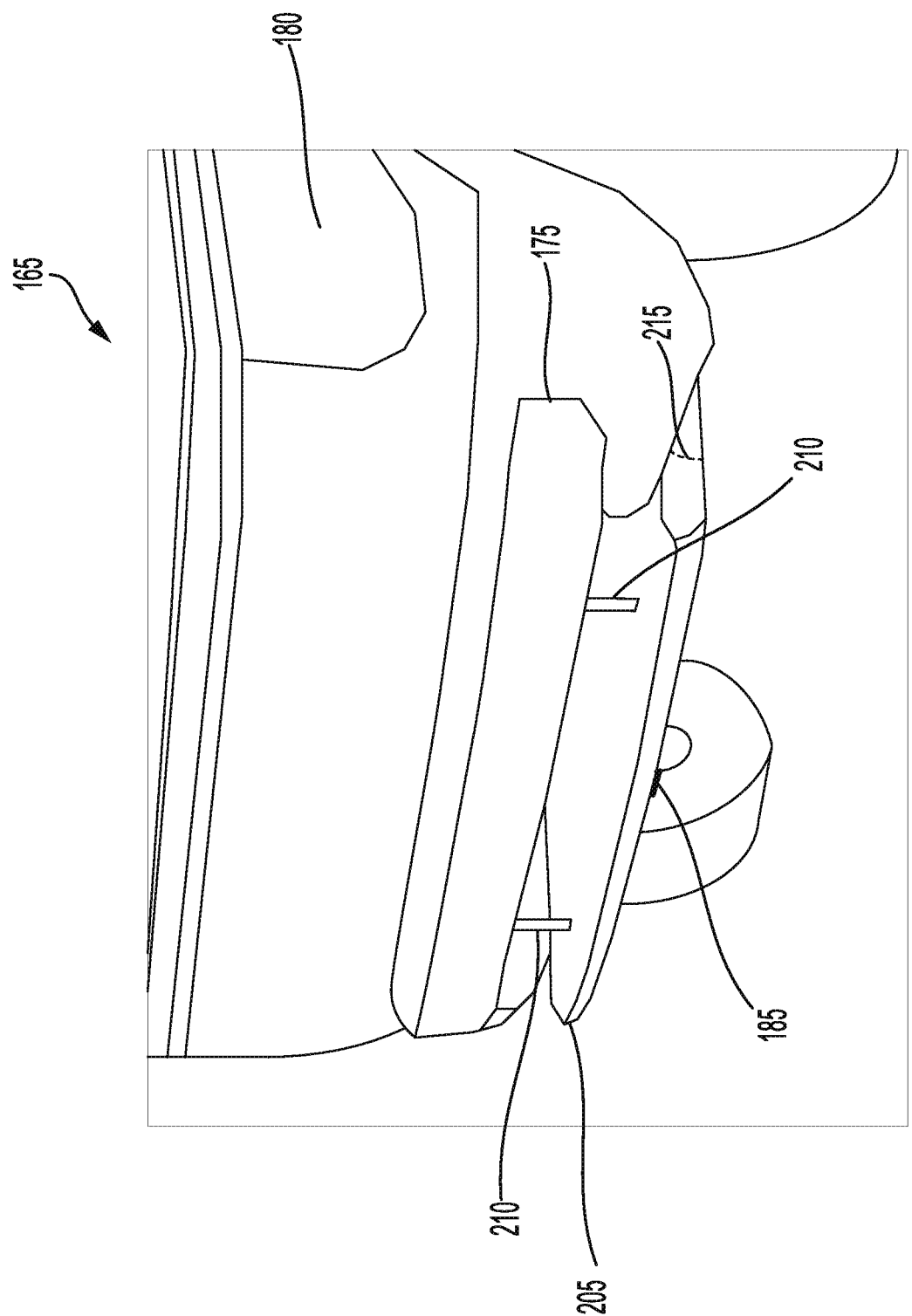
FIG. 2 depicts an example rear section of a vehicle, in accordance with some aspects.

FIG. 2 depicts an example rear section 165 of vehicle 105. The rear section 165 of the vehicle 105 can include at least one moveable member, shown as diffuser 205 and at least one actuator, shown as linear actuator 210. The diffuser 205 can be disposed at a rear section 165 of a vehicle 105. The diffuser 205 can be configured such that a side of the diffuser 205 is positioned to face a surface of the earth located under the vehicle 105. The diffuser 205 can be a panel of any shape, size, and material. In some examples, the diffuser 205 can retain a rigid shape, be controlled by actuators, and move between a plurality of positions. The diffuser 205 can be coupled to a rear section 165 of a vehicle 105. The diffuser 205 can be coupled with the vehicle 105 such that the diffuser 205 can move relative to the vehicle 105. For example, the diffuser 205 can move between a first position and a second position. The first position can be a stowed position. The stowed position of the diffuser 205 can provide the vehicle 105 with its largest departure angle. The larger the departure angle, the larger the incline the vehicle 105 can climb without interference from the vehicle 105. For example, the stowed position can include the diffuser 205 in a retracted position such that it is flush with an external shell of the vehicle 105 or disposed within the vehicle 105. A second position can be a deployed position. The deployed position can include the diffuser 205 in an extended position such that the diffuser 205 is oriented at an angle 215 away from the vehicle 105. The position of the diffuser can be configured to balance forces produced by air that moves over the vehicle with forces produced by air that moves under the vehicle. For example, the diffuser 205 can be rotatably coupled with the vehicle 105 via a hinged connection such that moving between the first position and the second position includes rotating the diffuser 205 around the hinged connection. The linear actuator 210 can be coupled with the diffuser 205. The linear actuator 210 can deploy the diffuser 205 from the first position to the second position. For example, to move from the first position to the second position, the linear actuator 210 can push the diffuser 205 away from the vehicle 105. To move from the second position to the first positon, the linear actuator 210 can pull the diffuser 205 closer to the vehicle 105.

The rear section 165 of the vehicle 105 can include a sensor 185. For example, the sensor 185 can be coupled with the diffuser 205. For example, the sensor 185 can be coupled with the side of the diffuser 205 that faces the surface of the earth. In such an example, the sensor 185 can move with the diffuser 205 when moving between a first position and a second position. The sensor 185 can protrude from the diffuser 205, be flush with the diffuser 205, or be disposed within the diffuser 205. The sensor 185 can detect an obstacle or potential obstacle for the diffuser 205. The obstacle can be external to the vehicle. For example, when in a deployed position, the diffuser 205 can me more susceptible to contact obstacles that are external to the vehicle 105 (e.g., rocks, bumps, fallen trees, etc.). The sensor 185 can detect when the vehicle 105 is approaching an obstacle. Based on a signal transmitted by the sensor 185 based on the obstacle detected, the diffuser 205 can move from a deployed position to a stowed position to avoid hitting the obstacle.

The signal from the sensor 185 can cause the diffuser to move between positions without detection of an obstacle or potential obstacle. For example, the sensor 185 can detect a surrounding area of the diffuser 205. The surrounding area can be, for example, an area within 300 feet of the diffuser 205 in any direction. When in a deployed position, the diffuser 205 can be more susceptible of getting hit by an external object such that having the diffuser 205 in a deployed position is not beneficial or could be detrimental to the diffuser 205. The sensor 185 can detect, for example, when the vehicle 105 is not on a paved road. Based on a signal transmitted by the sensor 185 based on the detection of the non-paved road, the diffuser 205 can move from a deployed position to a stowed position.

Figure 3:
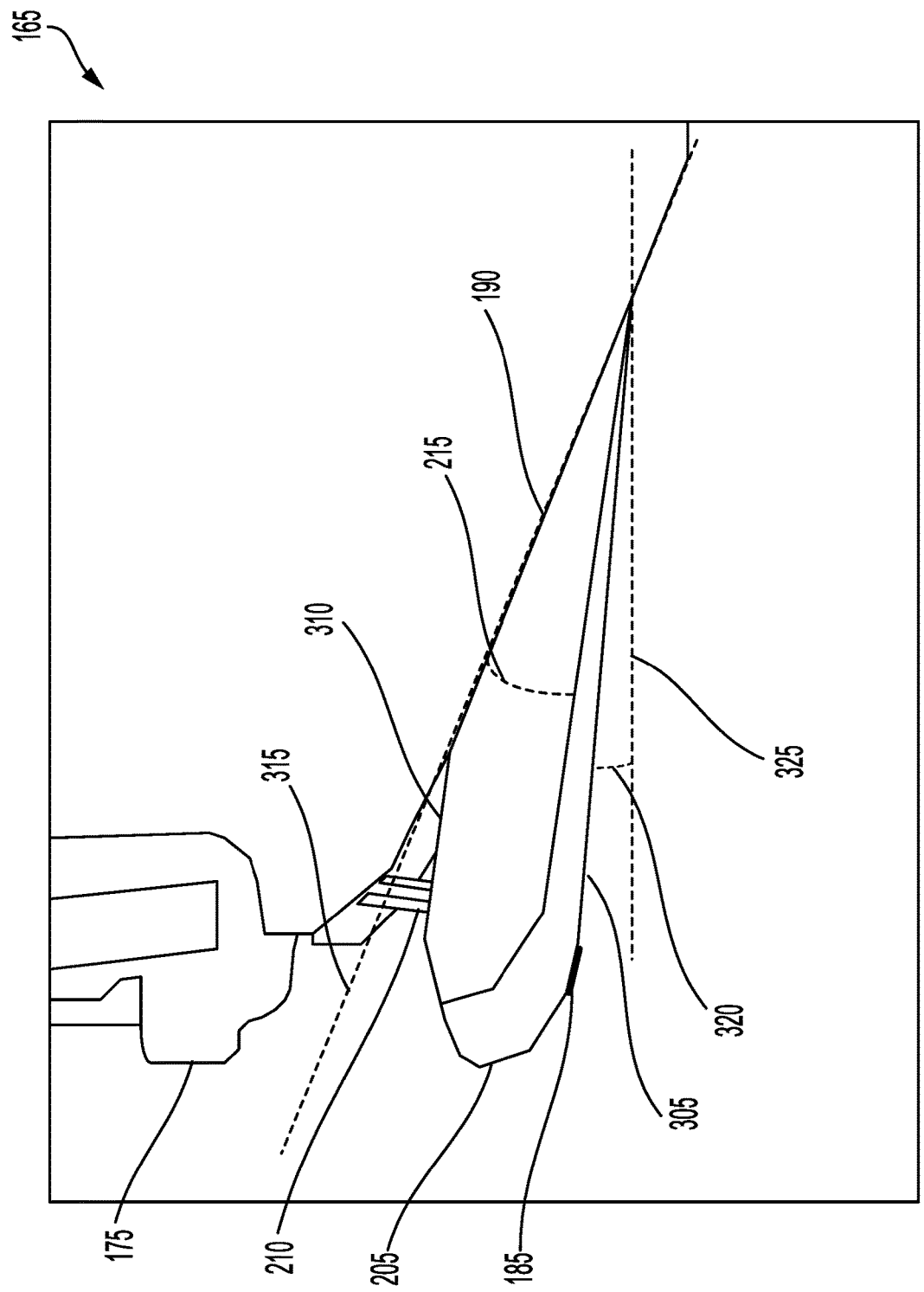
FIG. 3 depicts an example rear section of a vehicle with a diffuser that is deployed, in accordance with some aspects.

FIG. 3 depicts a side view of the example rear section 165 of vehicle 105 with the diffuser 205 in an example deployed position. In one example, when in the stowed position, a bottom side 305 of the diffuser 205 can be flush with the bottom 190 of the vehicle 105. In another example, when in the stowed position, a top side 310 of the diffuser 205 can be flush with the bottom 190 of the vehicle 105. In another example, when in the stowed position, the top side 310 of the diffuser 205 contacts a surface of the vehicle 105 such that it cannot move any closer to the vehicle 105. In another example, when in the stowed position, the diffuser 205 is disposed at a predetermined angle.

The angle of the diffuser 205 can be measured from various reference planes. For example, angle 215 can be measured based on an angle from reference plane 315, which aligns with the bottom 190 of the vehicle 105. For example, angle 215 can be an angle between the bottom 190 of the vehicle 105 and the bottom side 305 of the diffuser 205. Angle 320 can be measured based on a horizontal reference plane 325. For example, the angle 320 can be an angle between the horizontal reference plane 325 and the bottom side 305 of the diffuser 205. The horizontal reference plane 325 or axis can be parallel with at least a portion of the bottom 190 or at least a portion of the chassis 125.

The top side 310 of the diffuser 205 can have any shape. For example, the shape of the top side 310 can match a shape of a contact surface of the vehicle such that the top side 310 can be flush with the contact surface when in a stowed position. The bottom side 305 of the diffuser 205 can have any shape. For example, the bottom side 305 can be planar. In another example, the bottom side 305 can have a shape that matches a geometry of the rear section 165 of the vehicle 105. In such an example, the diffuser 205 can blend in with the rear section 165 of the vehicle 105 when in the stowed position.

Figure 4:
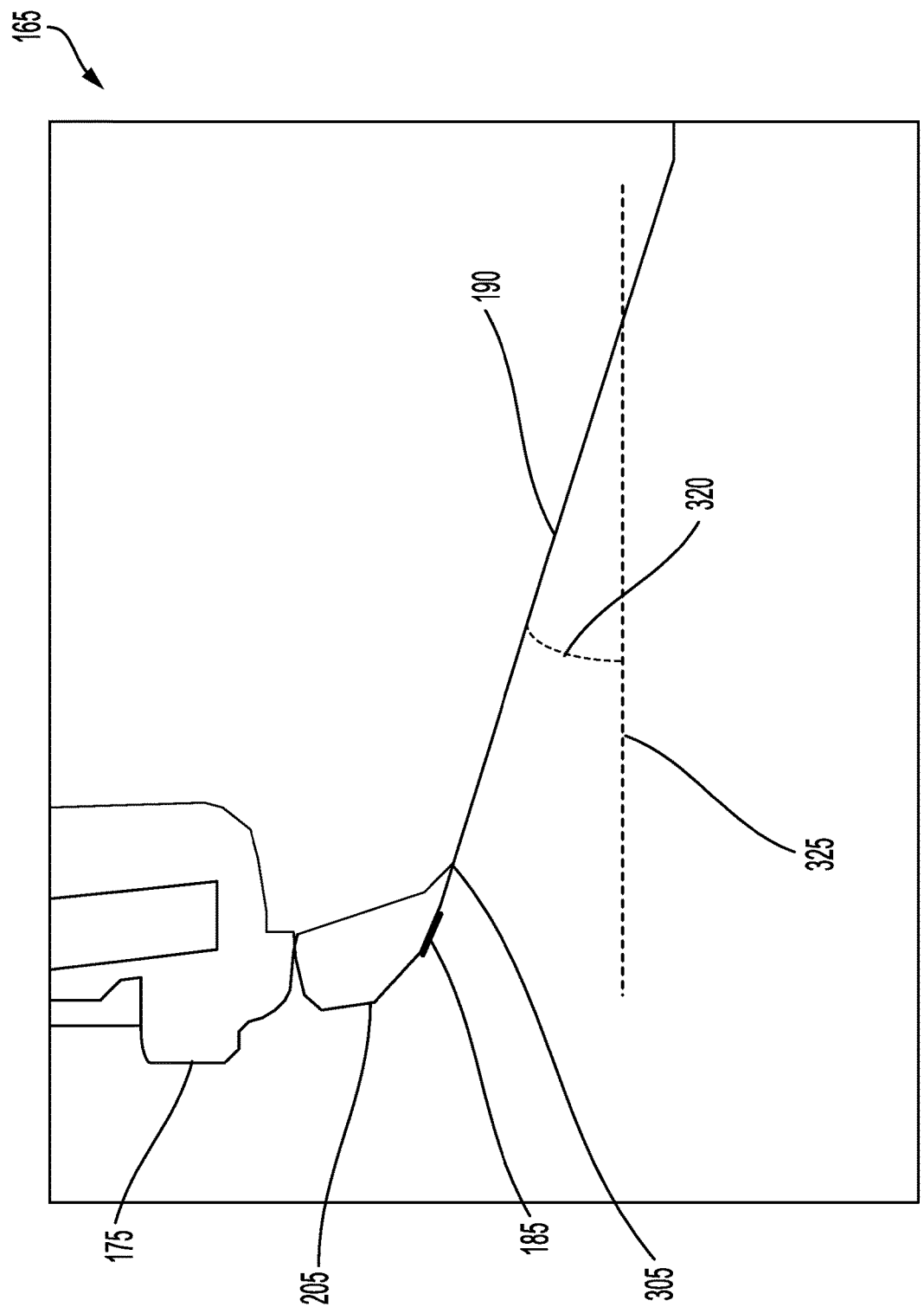
FIG. 4 depicts an example rear section of a vehicle with a diffuser that is stowed, in accordance with some aspects.

FIG. 4 depicts a side view of the example rear section 165 of vehicle 105 with the diffuser 205 in an example stowed position. As shown in FIG. 4, the bottom side 305 of the diffuser 205 can be aligned (e.g., flush) with the bottom 190 of the vehicle 105 when in the stowed position. In another example, the bottom side 305 can be disposed below the bottom 190 of the vehicle 105. In another example, the bottom side 305 can be disposed above the bottom 190 of the vehicle 105. The angle 215 between the bottom 190 and the bottom side 305 can be smaller when the diffuser 205 is in the stowed position compared to when the diffuser 205 is in a deployed position. When the bottom side 305 is flush with the bottom 190, angle 215 can be zero. Angle 320 between the horizontal reference plane 3255 and the bottom side 305 can be larger when the diffuser 205 is in the stowed position compared to when the diffuser 205 is in a deployed position. Depending on the shape and size of the diffuser 205, the diffuser 205 can be difficult to distinguish from the body of the vehicle 105 when in the stowed positon. For example, the shape and material of the diffuser 205 can closely resemble that of the vehicle 105.

Figure 5A:
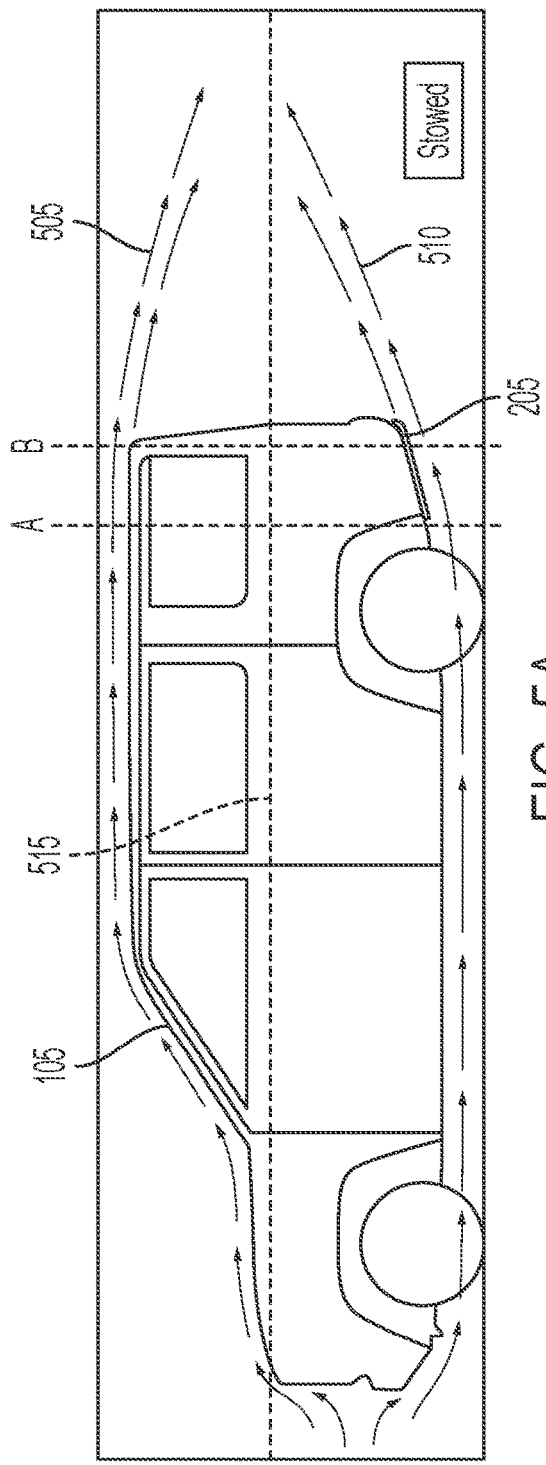
FIG. 5A depicts air movement around an example vehicle with a diffuser in a stowed position, in accordance with some aspects.
Figure 5B:
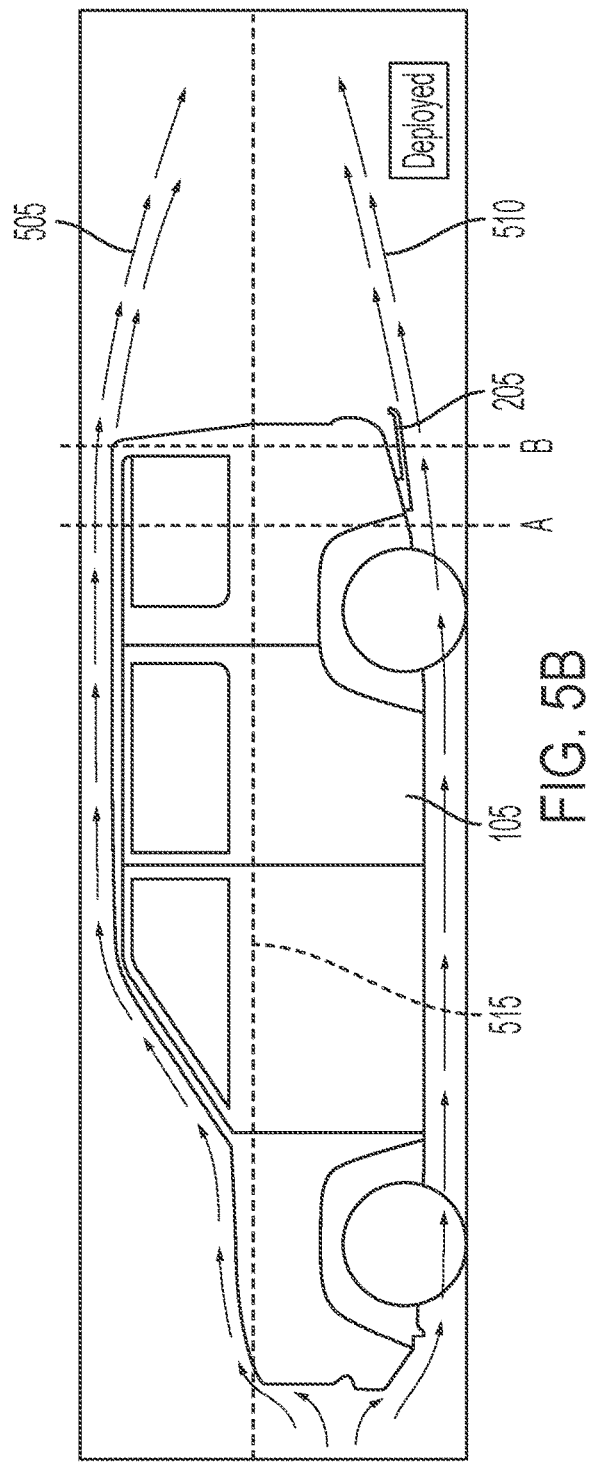
FIG. 5B depicts air movement around an example vehicle with a diffuser in a deployed position, in accordance with some aspects.

FIGS. 5A and 5B depict an example of air movement around a vehicle 105 with a diffuser in a stowed position and in a deployed position. Air can move over the vehicle 105, shown as top air 505, and air can move under the vehicle 105, shown as bottom air 510. The amount or rate of airflow above or below the vehicle 105 can increase as the speed of the vehicle 105 increases. When the diffuser 205 is in the stowed position, as shown in FIG. 5A, the top air 505 can apply a force on the vehicle 105 that may not match a force applied on the vehicle 105 by the bottom air 510. For example, a trajectory of the top air 505 can be different than a trajectory of the bottom air 510. For example, the bottom air 510 flows under the vehicle 105 with a first trajectory until it reaches point A. At point A, the bottom air 510 starts to move with a second trajectory which begins to angle toward a center of the vehicle 105, shown as centerline 515. The top air 505 flows over the vehicle 105 with a first trajectory until it reaches point B. At point B, the bottom air 510 starts to move with a second trajectory which begins to angle toward the centerline 515. The unbalanced forces can be created from this non-symmetrical airflow. The unbalanced forces can create or increase a drag force on the vehicle 105. Deploying the diffuser 205 can cause the forces exerted by both the top air 505 and the bottom air 510 to become more symmetrical, as shown in FIG. 5B, and decrease the drag force applied on the vehicle 105 relative to when the diffuser 205 is stowed. For example, the diffuser 205 in the deployed position can balance the forces exerted on the vehicle 105 by both the top air 505 and the bottom air 510. For example, the deployed diffuser 205 can cause the first trajectory of the top air 505 and the first trajectory of the bottom air 510 to switch to the second trajectory and begin to angle toward the centerline 515 at approximately the same point (e.g., point B). As shown in FIG. 5B, the airflow behind the vehicle 105 with the deployed diffuser 205 can be more symmetrical about the centerline than the airflow behind the vehicle 105 with the stowed diffuser 205.

Figure 6:
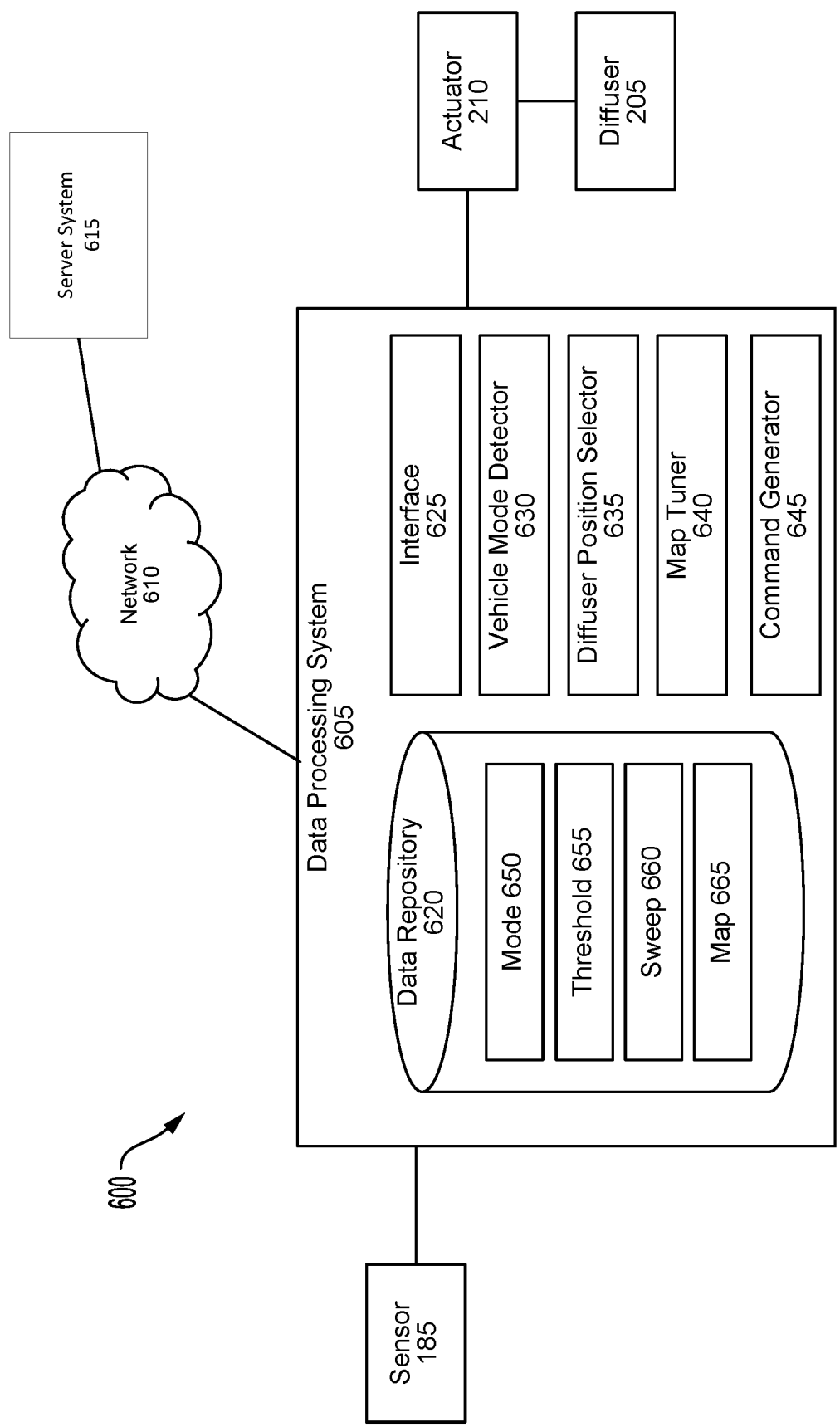
FIG. 6 depicts an example block diagram for a data processing system to move a diffuser, in accordance with some aspects.

FIG. 6 depicts a block diagram of an example system 600 to move a diffuser. The system 600 can be employed to implement elements of the systems and methods described and illustrated herein. The system 600 can include at least one data processing system 605, at least one network 610, and at least one server system 615. Various systems and devices may be communicatively and operatively coupled through the network 610, which may include one or more of the Internet, cellular network, Wi-Fi, Wi-Max, or any other type of wired or wireless network or a combination of wired and wireless networks. The server system 615 can be communicatively coupled with the data processing system 605 through the network 610. The server system 615 can by any computing system, local or remote, configured to communicate with the data processing system 605. For example, the server system 615 can be associated with a manufacturer of a vehicle 105. System updates, new data, and other information can be exchanged between the server system 615 and the data processing system 605 of the vehicle 105. For example, as described in more detail below, as new diffuser positions are determined to provide better drag reduction to the vehicle 105, that data can be transmitted between the data processing system 605 and the system server 615. For example, the manufacturer may conduct tests and run simulations that provide updated data. The updated data can be transmitted to the data processing system 605 to update, for example, a threshold 655 or a map 665. In another example, the data processing system 605 may perform map tuning and identify a better diffuser position for a specific set of parameters. The better diffuser position or an updated map 665 can be transmitted to the manufacturer. In some examples, the server system 615 can perform the same functions as the data processing system 605, which are described in more detail below. In some cases, the server system 615 can receive data from a fleet of vehicles 105 in order to generate or update a map 665 or lookup table of diffuser positions, and provide the updated or generated map 665 to one or more vehicles 105 in the fleet.

The data processing system 605 can determine when to move a diffuser 205 of a vehicle 105 and to what position to move the diffuser 205. For example, the data processing system 605 can receive and analyze various inputs, data points, and instructions to determine if the diffuser 205 should be in a stowed position or a deployed position. For example, inputs, data points, and instructions indicating off-road conditions can prompt the data processing system to move the diffuser 205 to a stowed position (or keep the diffuser 205 in the stowed position) in order to provide the vehicle 105 with the greatest possible departure angle. Inputs, data points, and instructions indicating smooth driving paths can prompt the data processing system to move the diffuser 205 to a deployed position (or keep the diffuser 205 in a deployed position) in order to reduce drag on the vehicle 105. When the data processing system 605 determines the diffuser 205 can be in a deployed position, the data processing system 605 can determine what deployed position the diffuser 205 should be disposed at. For example, a first position can provide better drag reduction for a first set of parameters (e.g., speed, ride height, weather, vehicle configuration, etc.) and a second position can provide a better drag reduction for a second set of parameters. The data processing system 605 can move the diffuser 205 to different positions (e.g., angles) depending on any combination of inputs, data points, and instructions.

The data processing system 605 can be a local processing system that can implement elements of the systems and methods disclosed herein for a specific vehicle 105. For example, the data processing system 605 can be installed as part of, or be coupled with, a vehicle 105. The data processing system 605 can perform one or more of the functions disclosed herein for said vehicle 105. In some cases, the data processing system 605 can be a remote processing system configured to perform one or more functions for the vehicle 105, but from a remote location.

The data processing system 605 can include at least one data repository 620, at least one interface 625, at least one vehicle mode detector 630, at least one diffuser position selector 635, at least one map tuner 640, and at least one command generator 645. The data repository 620 can collect, store, update, and manage data used for the systems and methods disclosed herein. For example, the data repository 620 can include at least one mode 650, at least one threshold 655, at least one sweep 660, and at least one map 665. The mode 650 can be a mode of operation of the vehicle 105. For example, the mode of operation can be an off-roading mode, a cruise control mode, a vehicle speed, a vehicle ride height, a vehicle configuration, among others. The threshold 655 can be a predetermined threshold that determines when to move a diffuser 205 from a first position to a second position. For example, the threshold 655 can indicate a vehicle speed at which the diffuser 205 can move from a stowed position to a deployed position. The sweep 660, can be a set of positions between which the diffuser 205 can move. For example, the set of positions can be a set of predetermined angles. The diffuser 205 can be positioned at each of the predetermine angles. The map 665 can be a set of instructions indicating where to move a diffuser 205 based on various inputs, data points, and instructions. For example, the map 665 can indicate a target position of a diffuser based on the modes 650, thresholds 655, sweeps 660, and other inputs. The map 665 can indicate positions based on the mode 650, the threshold 655, and the sweep 660, and various other inputs, alone or in any combination. For example, the map 665 can identify when a diffuser 205 can move from a first position to a second position and determine what the second position is based on any combination of modes 650, thresholds 655, sweeps 660, and other inputs. For example, a vehicle 105 can be in Mode X and can be satisfying threshold Y. The sweep 660 can include angles A, B, and C. The map 665 can indicate that with Mode X and threshold Y being satisfied, the diffuser 205 at angle B would provide the most drag reduction for the vehicle 105. In one example, the map 665 can be a lookup table. For example, the lookup table can be for speed, ride height, and diffuser angle (e.g., angle 215 or angle 320). Each element of the data repository 620 is described in more detail below.

The interface 625 of the data processing system 605 can receive various inputs and provide various outputs regarding the systems and methods disclosed herein. The interface 625 can receive various forms of input. For example, the input can be a signal from a sensor (e.g., signal indicating an approaching obstacle), instructions from a programmer (e.g., defining parameters that indicate an off-roading environment), a selection from an operator (e.g., operator pushing a button), data from a remote server 615 (e.g., updated sweep 660 based on simulations), among others. The interface can include an input device such as a keyboard, voice interface, touch screen display, or a cursor control (e.g., a mouse, trackball, etc.) for communicating direction information and command selections to the data processing system 605. The input received via the interface 625 can be stored in the data repository. For example, when the interface 625 receives input including data for updating a mode 650, a threshold 655, a sweep 660, or a map 665, the data can be stored in the data repository 620 or used to update the data already in the data repository 620. In other examples, the input received may not be stored in the data repository 620.

The data repository 620 can act as a storage databased for the data processing system 605. The data repository 620 can include random access memory (RAM) or other dynamic storage for storing information and instructions to be executed by the data processing system 605 and the components thereof. The data repository 620 can be used for storing position information, vehicle information, command instructions, vehicle status information, environmental information within or external to the vehicle, road status or road condition information, or other information during execution of instructions by the data processing system 605. The data repository 620 can also include a read only memory (ROM) or other static storage device for storing static information and instructions for the data processing system 605.

The interface 625 can receive input from a sensor 185. For example, a sensor 185 can be disposed on an exterior of a vehicle 105. For example, the sensor 185 can be disposed on a bottom 190 of the vehicle 105. In other examples, the sensor 185 can be disposed on a front of the vehicle 105 or a top of the vehicle 105. The sensor 185 can detect obstacles or potential obstacles. Obstacles can be any physical structure capable of contacting the diffuser 205 when the diffuser 205 is in a deployed position. For example, an obstacle can be a rock or a fallen tree. The sensor 185 can transmit a signal to the data processing system 605 upon detection of an obstacle. The signal can indicate information regarding the obstacle including, but not limited to, size of obstacle, distance away from the obstacle (e.g., distance between obstacle and sensor, obstacle and front of vehicle 105, obstacle and diffuser 205, etc.), obstacle type (e.g., a boulder), a lateral position of the obstacle (e.g., in the center of the vehicle 105 or off to the right or left side), among others. The vehicle 105 can also include other sensors 185 configured to detect other data that can impact a position of a diffuser 205. For example, the sensor 185 can detect the surrounding area of the diffuser 205. The sensor 185 can transmit a signal to the data processing system 605 upon detection of the surrounding area.

The interface can provide outputs. For example, the interface 625 can provide an output to an operator of the vehicle 105. The interface 625 can include a display (e.g., a liquid crystal display, an active matrix display, etc.) to provide the output. For example, the output can include information regarding the diffuser 205 of the vehicle 105 (e.g., current position of diffuser 205, thresholds to meet in order to move diffuser 205, warnings about the diffuser 205, etc.). In another example, the interface 625 can transmit data to a remote server system 615. For example, when map tuning is performed (discussed in more detail below), the results of the map tuning can be sent to the remote server 615. The interface 625 enables the data processing system 605 to exchange data between the data repository 620 and external server system 615.

The vehicle mode detector 630 can identify a mode of operation of a vehicle 105. The data repository 620 can store a plurality of modes of operation that the vehicle 105 can be in. For example, the mode of operation can include various vehicle parameters include a vehicle mode (e.g., an off-roading mode, a cruise control mode, a sport mode, etc.), a vehicle speed, a vehicle ride height, a vehicle configuration, among others. The vehicle mode detector 630 can identify which of the plurality of modes of operation the vehicle 105 is currently in. For example, the vehicle mode detector 630 can identify the mode of operation of the vehicle 105 based on an input received via the interface 625. For example, an input indicative of an off-roading mode can be at least one of a selection by an operator to activate an off-roading mode (e.g., operator pushing a button), a GPS indication that the vehicle 105 is entering off-roading territory (e.g., GPS indicates the vehicle 105 is in a park designated for off-roading), a signal from a vibration sensor indicating vibration readings indicative of off-roading, a signal from a sensor indicating certain vehicle accessories have been attached to the vehicle 105 (e.g., an off-road bumper has been attached to the vehicle 105), among others. The vehicle mode detector 630 can identify a vehicle speed based on a reading from the speedometer of the vehicle. The vehicle mode detector 630 can identify a vehicle ride height based on predetermined parameters set for the vehicle 105 or a selection by an operator of the vehicle 105, among others. The vehicle mode detector 630 can identify a vehicle configuration based on signals received from sensors indicating when accessories are attached to the vehicle, signals received from sensors measuring tread and air pressure, and predetermined parameters indicating a trim package of the vehicle (e.g., vehicle contour and mass), among others.

The diffuser position selector 635 of the data processing system 605 can determine a position to which to move a diffuser 205 of a vehicle 105. For example, sweep 660 can define a range of positions for when the diffuser 205 is in a deployed state. For example, the rage of positions can include a set of angles at which the diffuser 205 can be oriented. The diffuser position selector 635 can determine which position of the range of positions the diffuser 205 can be at to minimize drag on the vehicle 105, and also to avoid damaging the diffuser 205. For example, when conditions allow a diffuser 205 to be deployed, the diffuser position selector 635 can determine an angle for the diffuser 205 that will minimize drag on the vehicle 105. However, when conditions may prevent the diffuser 205 from being deployed (e.g., off-roading, identified obstacles, etc.), the diffuser position selector 635 can determine the position of the diffuser 205 to be a stowed position.

The diffuser position selector 635 can determine the position to which to move the diffuser 205 based on a plurality of parameters. For example, the diffuser position selector 635 can determine the position based on input from a sensor 185 and a mode of operation 650. For example, the diffuser position selector 635 can receive the mode of operation 650 from the vehicle mode detector 630. The mode of operation 650 can correspond with a position for the diffuser 205. For example, map 665 can indicate that the diffuser 205 can be deployed at a specific angle when the vehicle 105 is traveling at a speed that exceeds a threshold 655. For example, the diffuser position selector 635 can identify a threshold speed. The diffuser position selector 635 can determine the speed of the vehicle 105 exceeds the threshold speed. The diffuser position selector 635 can select the position of the diffuser 205 based on the speed of the vehicle 105 exceeding the threshold speed. For example, the diffuser 205 can be deployed at an angle of ten degrees from the stowed position when the vehicle 105 is traveling at or above fifty miles per hour. In such an example, the diffuser position selector 635 can apply the parameter (e.g., the mode of operation 650) to the map 665 and determine a corresponding position from the sweep 660. In another example, the vehicle mode detector 630 can identify the mode of operation of the vehicle to be an off-road mode. The diffuser position selector 635 can determine the position for the diffuser 205 is the stowed position when the vehicle is in the off-road mode.

The diffuser position selector 635 can receive one or more modes of operation to apply to the map 665. For example, the map 665 can be a universal map 665 such that a data processing system 605 of any vehicle 105 can reference the map 665 to determine a position for a diffuser 205. The modes of operation can include vehicle configuration (e.g., trim package, vehicle accessories, tire tread and air pressures, etc.) or vehicle ride height, for example. The map 665 can cross-reference the modes of operation and other parameters of the vehicle 105 to determine the position of the diffuser 205. For example, a vehicle 105 with a ride height of eight inches, a tire pressure of 32 pounds per square inch ("psi"), a rack attached to a rear of the vehicle, and traveling at a speed of 60 mph can correspond with a diffuser position of 10 degrees from the bottom 190 of the vehicle 105. The map 665 can include fewer, more, or different parameters. With a universal map 665, any updates to sweeps 660, thresholds 655, or modes 650 can be made to the single map 665 instead of having to update a map 665 for each individual vehicle or type of vehicle. If the map 665 is not universal and is customized for the vehicle 105, the diffuser position selector 635 may not have to apply certain parameters to the map 665 because they are already taken into account. For example, if Vehicle A has a ride height of 8 inches and has an identified tire tread, those parameters can remain constant and be applied when creating the map 665 such that the parameters may not be considered each time the diffuser 205 is moved.

In another example, the diffuser position selector 635 can determine the position based on input received from a sensor 185. For example, the sensor 185 can detect obstacles or potential obstacles (e.g., any physical object) approaching the vehicle 105. The sensor 185 can also detect a surrounding area. When the sensor 185 detects an obstacle, the sensor 185 can transmit a signal to the data processing system 605 indicating information associated with the obstacle (e.g., size of the obstacle, location of the obstacle, distance away from the diffuser 205, etc.). The diffuser position selector 635 can analyze the signal and determine whether to move the diffuser 205 to avoid contacting the obstacle. For example, the signal can indicate a height of the obstacle. The diffuser position selector 635 can compare the height of the obstacle with a current position of the diffuser 205 and determine if the obstacle and diffuser 205 may hit. In one example, upon detection of an obstacle, the diffuser position selector 635 can move the diffuser 205 to a stowed position (or keep the diffuser 205 in the stowed position. In another example, upon detection of an obstacle, the diffuser position selector 635 can identify a height of the obstacle, determine the obstacle is tall enough to hit the diffuser 205, and retract the diffuser 205 to a position at which the obstacle cannot hit the diffuser 205. In such an example, the diffuser 205 can remain in a deployed position upon detection of an obstacle, but can be moved to avoid any contact.

In one example, the diffuser position selector 635 can receive and process the obstacle information from the sensor 185 and determine how to move the diffuser 205 based on its own processing. In another example, the diffuser position selector 635 can apply the information indicated by the signal from the sensor 185 to the map 665 to determine the position to which to move the diffuser 205. For example, the map 665 can indicate that with any detection of an obstacle, the data processing system 605 can move the diffuser 205 to the stowed position. In another example, based on the obstacle information, the map 665 can indicate a specific position for the diffuser 205. For example, the diffuser position selector 635 can apply the signal from the sensor 185 to the map 665 as well as the current position of the diffuser 205. The map 665 can include instructions based on the input from the diffuser position selector 635. For example, the map 665 can indicate that when the diffuser 205 is at a fifteen degree angle and an approaching obstacle is ten inches tall, the data processing system 605 can move the diffuser to a ten degree angle to avoid the obstacle. For example, the map 665 can indicate that based on the vehicle 105 and the diffuser 205, a fifteen degree angle provides a clearance between the diffuser 205 and the ground of eight inches. When the obstacle height exceeds the clearance, the map 665 can indicate a position at which the clearance is greater than the height.

The diffuser position selector 635 can also determine when to move the diffuser 205. For example, the signal from the sensor 185 can include a distance between the obstacle and the diffuser 205. Based on the distance and a speed of the vehicle 105, the diffuser position selector 635 can determine how long until the obstacle contacts the diffuser 205, and therefore how quickly to move the diffuser. The diffuser position selector 635 can also determine when to return the diffuser 205 to a previous position. For example, when an obstacle has been passed, the diffuser position selector 635 can select the previous position of diffuser 205 as the next position. For example, the sensor 185 can transmit a signal indicating that there is no longer an obstacle ahead. Responsive to receipt of that signal, the diffuser position selector 635 can choose to return the diffuser 205 to its previous position.

In some examples, the diffuser position selector 635 can be temporarily disabled. For example, if an operator activates an "off-road" mode of the vehicle 105, the data processing system 605 can lock the diffuser 205 in a stowed position and prevent the diffuser position selector 635 from selecting any other positions for the diffuser 205. In other examples, an operator can indicate a manual mode such that the operator can select the positon of the diffuser 205. However, in such an example, the map 665 can include instructions indicating a command hierarchy. For example, an operator can choose to go into manual mode and manually select the diffuser position, but if the operator also activates the off-road mode, the off-road selection can override the manual position selection and keep the diffuser 205 in the stowed position.

The position the diffuser position selector 635 chooses to move the diffuser 205 can be a position selected from a predetermined plurality of positions. For example, the plurality of positions can include a first positions and a second position. The plurality of positions can be defined by the sweep 660. For example, the sweep 660 can identify a plurality of predetermined angles 215 at which the diffuser 205 can extend from the vehicle 105. The angle can be based on input from a sensor 185 and a mode of operation 650. The angles can be defined from various reference points. For example, referring back to FIG. 3, angle 215 can define a distance the diffuser 205 moves away from the stowed position (e.g., the diffuser will rotate X degrees from its stowed position). Angle 320 can define an offset distance between the diffuser 205 and a horizontal reference plane 325. The examples herein may indicate an angle with respect to the stowed position, but can be made with reference to any other reference plane. The sweep 660 can define a plurality of predetermined angles with a minimum and a maximum angle. For example, the sweep 660 may allow the diffuser 205 to rotate between zero degrees (e.g., the stowed position) and ninety degrees. This plurality of predetermined angles can be established for any combination of different inputs. For example, for any combination of speed vehicle mode, vehicle ride height, vehicle configuration, and other inputs, etc., the plurality of predetermined angles includes an angle corresponding to any combination of those parameters. These relationships can be defined by the map 665.

The plurality of predetermined angles and which angle corresponds to which combination of parameters can be updated to reflect new data. For example, new data can come from various tests and simulations. For example, an entity can perform various tests and simulations that generate better drag reduction results than the current map 665 and range of angles can provide. The data processing system 605 can receive input from a server system 615 associated with the entity that performed the tests and simulations via the network 610. The input can include an update to the map 665. The map 665 correlates a plurality of modes of operation of the vehicle with the plurality of predefined angles. The map 665 can be updated based on the input. For example, the predetermined plurality of angles can be updated according to the input. In another example, which angle correlates to which combination of inputs can be updated according to the input. For example, a map 665 may indicate that the diffuser 205 can be at a 20 degree angle when the vehicle 105 is traveling over 50 mph to provide the most drag reduction. Remote simulations can show that a diffuser 205 at 25 degrees when the vehicle 105 is traveling over 70 mph reduces the drag on the vehicle 105 more. The server system 615 can provide input to the data processing system 605 to update the map 665 to indicate that when traveling between 50-70 mph, the diffuser angle should be 20 degrees, and when traveling above 70 mph, the diffuser angle should be 25 degrees.

The plurality of predetermined angles can be updated based on detected changes to a vehicle configuration. For example, a change in tire pressure, an accessory is attached to/removed from the vehicle 105, and new tires being put on the vehicle 105 can all affect the plurality of predetermined angles. The change in a vehicle configuration can be detected by an operator of the vehicle, can be detected automatically using sensors 185 of the vehicle 105, or updated from an entity's remote vehicle/customer database. For example, the vehicle mode detector 630 can determine when changes are made to the vehicle 105.

The data processing system 605 can update the plurality of predetermined angles 215, 320 by tuning the map 665 using a map tuner 640. The map tuner 640 can perform map tuning by monitoring performance of the vehicle 105 when the diffuser 205 is at a plurality of different positions. For example, while a vehicle 105 is traveling at a constant speed, the diffuser 205 can move between a plurality of positions, for example, between a 10 degree angle and a 15 degree angle at 1 degree increments. When the diffuser 205 is at each position, the map tuner 640 can monitor the performance of the car (e.g., measure drag felt by the car or calculate miles per kilowatt-hour ("kWh")). Based on the performance at each position, the map tuner 640 can generate a ranking of the plurality of positions. For example, a position that produced the least amount of drag can be ranked first or highest. The map tuner 640 can update the map 665 based on the rankings. For example, the map tuner 640 can update a lookup table with one or more of the plurality of positions based on the ranking. For example, when the position of the 13 degree angle 215 provided the highest ranking performance when the vehicle 105 was traveling at 40 mph, the map tuner 640 can update map 665 such that when the vehicle 105 is traveling at 40 mph, the diffuser positon selector 635 can apply the speed to the map 665 and determine the positon of the diffuser 205 to be 13 degrees. This tuning process can be performed responsive to a condition. For example, the condition can include a predetermined time interval (e.g., once a month), a predetermined mileage interval (e.g., every 5,000 miles), a change in vehicle configuration, a request by an operator, among others. Upon detecting an improvement through the map tuning process, the map tuner 640 can transmit the improvement to a remote server system 615 via the network 610 such that the update can be aggregated for all vehicles 105. For example, an updated lookup table can be transmitted to a database remote from the vehicle 105. The remote server system 615 can provide updated maps 665 or lookup tables to vehicles 105 via an over-the-air update. An example lookup table is provided below in Table 1.

TABLE 1

A lookup table considering ride height, tire pressure, and vehicle speed to determine angle of diffuser

| Ride Height | Tire Pressure | Vehicle Speed | | | | | |
|---|---|---|---|---|---|---|---|
| | | 20-30 MPH | 30-40 MPH | 40-50 MPH | 50-60 MPH | 60-70 MPH | 70-80 MPH |
| 6.5 inches | 32 PSI | 10° | 15° | 20° | 25° | 30° | 35° |
| | 35 PSI | 12° | 17° | 22° | 27° | 32° | 37° |
| | 40 PSI | 14° | 19° | 24° | 29° | 34° | 39° |
| 8 inches | 32 PSI | 20° | 25° | 30° | 35° | 40° | 45° |
| | 35 PSI | 22° | 27° | 32° | 37° | 42° | 47° |
| | 40 PSI | 24° | 29° | 34° | 39° | 44° | 49° |

Table 1 is an example lookup table or map 665. The values in Table 1 are meant to be exemplary. Table 1 can be used to determine a position for the diffuser 205 based on a combination of parameters including ride height, tire pressure, and vehicle speed. In other examples, the lookup table can include fewer, more, or different parameters. For example, trim package can be added to the table or can replace one of the current parameters. The vehicle speed ranges can also be modified (e.g., increments of 20, increments of 1, etc.). The positions (e.g., the angles) can be modified by the data processing system 605 based on map tuning or from receiving input from an external source (e.g., system server 615), among others.

The data processing system 605 can generate a command and transmit the command to a receiver, shown as actuator 210. The command generator 645 of the data processing system 605 can generate and transmit the command. For example, the command generator 645 can transmit the command to an actuator 210 to move a diffuser 205 to a position determined based on an input from a sensor 185 and a mode of operation 650 of a vehicle 105. For example, the data processing system 605 can be in communication with the sensor 185 and the actuator 210. The sensor 185 can be any type of sensor, including but not limited to an object sensor to detect oncoming obstacles, a speedometer to detect a speed of the vehicle 105, a sensor configured to measure drag on a vehicle 105, a pressure sensor coupled with the actuator 210 to detect when abnormal pressure is being applied, a thermometer, an anemometer, an hygrometer, among others.

The command generator 645 can generate a command to deploy the diffuser 205 or to retract the diffuser 205. For example, an input from a sensor 185 and a mode of operation 650 of the vehicle 105 can indicate a scenario for the diffuser 205 to be in a deployed position. For example, as described above, the diffuser position selector 635 can determine a position to which to move the diffuser 205 based on input from a sensor and a mode of operation of the vehicle 105. Based on the position selected by the diffuser position selector 635, the command generator 645 can generate a command to activate the actuator 210 to move the diffuser to the position. For example, the diffuser position selector 635 can determine the position to which to move the diffuser is an angle 215 of 20 degrees from the stowed position. Responsive to the determination, the command generator 645 can generate and transmit a command to the actuator 210 to move the diffuser 205 to a 20 degree angle. Responsive to transmitting the command, the actuator 210 can move the diffuser 205 to the position. In one example, the diffuser positon selector 635 can determine the positon to be the stowed position when the vehicle mode detector 630 identifies a mode of operation 650 of the vehicle 105 to be an off-road mode. The command generator 645 can transmit a command to the actuator 210 to retract the diffuser 205 responsive to entry of the vehicle into the off-road mode.

In another example, the diffuser positon selector 635 can determine the positon of the diffuser 205 based on a threshold speed. For example, a sensor 185 can detect a speed of the vehicle 105. The vehicle mode detector 630 can identify a threshold speed 655 and determine the speed of the vehicle 105 exceeds the threshold speed 655. The command generator 645 can transmit a command to the actuator 210 to move the diffuser to a position based on the speed exceeding the threshold speed 655. The position can be determined by the diffuser positon selector 635 and be based on the speed of the vehicle 105.

In another example, the diffuser positon selector 635 can determine the positon of the diffuser 205 based on a detection of an obstacle. For example, a sensor 185 can detect an obstacle external to the vehicle 105. Accordingly, the diffuser position selector 635 can determine the positon for the diffuser 205 is the stowed positions. The command generator 645 can transmit a command to the actuator to retract the diffuser 205 to the stowed position such that the diffuser can avoid the external obstacle.

In another example, the command generator 645 can generate and transmit a command to perform the map tuning. For example, the command generator 645 can generate and transmit a first command to the actuator 210 to move the diffuser to a plurality of positions for the mode of operation of the vehicle. In some examples, map tuning includes a single command from the command generator 645 indicating the different positions of the diffuser 205. In other examples, map tuning includes a plurality of commands. For example, the command generator 645 transmits a command for each position of the diffuser 205. For map tuning, the command transmitted to the actuator 210 can be to generate a ranking of the plurality of positions to update a lookup table.

The command generator 645 can generate and transmit a notification. For example, the command generator 645 can provide a notification to an operator of the vehicle 105 when the diffuser 205 moves to the position. For example, a notification can be transmitted when the diffuser 205 moves. Alternatively, a notification is transmitted based on circumstances. For example, the command generator 645 can generate a notification when a sensor 185 detects an obstacle and the diffuser 205 moves from a deployed position to the stowed position. The command generator 645 can provide a notification to the operator when the diffuser 205 cannot move to the position. For example, a pressure sensor 185 associated with an actuator 210 senses extra pressure when attempting to retract the diffuser 205 to the stowed position. For example, an object can enter a cavity defined between the vehicle 105 and the diffuser 205 when the diffuser 205 is in a deployed position. The object can prevent the diffuser 205 from reaching the stowed position (e.g., a rock is stuck between the diffuser 205 and the vehicle 105. The command generator 645 can generate the notification to indicate the issue or malfunction. The notification may be an audio notification (e.g., an alarm) or a visual notification (e.g., lights flashing on dashboard, message displayed on a user device, etc.). The command generator 645 can generate and transmit notifications for other circumstances, including but not limited to when the map 665 is updated, when the diffuser 205 is locked in the stowed position (e.g., car is in off-road mode), when map tuning is in progress, etc.

Figure 7:
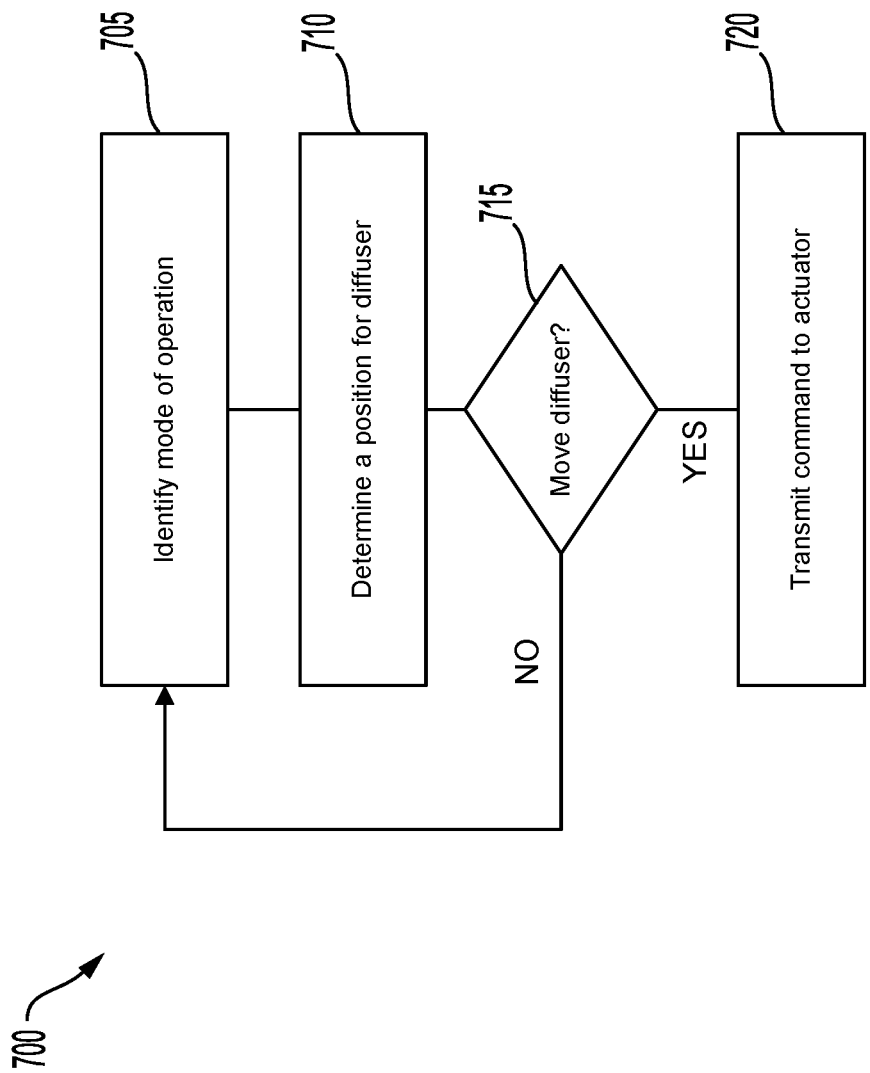
FIG. 7 is a flow diagram illustrating an example method to move a diffuser, in accordance with some aspects.

FIG. 7 depicts a flow diagram of an example method 700. The method 700 can be performed by one or more systems or components depicted in FIG. 6 or FIG. 10, including, for example, a data processing system 605. Method 700 can be a method of moving a diffuser 205 of a vehicle 105 to a desired position. Method 700 can include identifying at least one mode of operation 705, determining a position for a diffuser 710, determining whether to move the diffuser 715, and transmitting a command to an actuator to move the diffuser 720. Act 705 of identifying a mode of operation can include one or more processors analyzing parameters of a vehicle 105 and identifying a mode 650 from the data repository 620 that the vehicle 105 is in. A mode of operation 650 can include any parameter of the vehicle including a vehicle mode (e.g., off-roading, cruise control, etc.), vehicle speed, vehicle configuration, vehicle ride height, etc. The vehicle mode detector 630 can determine the mode of operation 650 by accessing the data repository 620 or by analyzing inputs received by the data processing system 605. For example, the vehicle mode detector 630 can retrieve data regarding a vehicle ride height from the data repository 620. In another example, the vehicle mode detector 630 can determine the speed of the vehicle 105 from an input from a sensor 185 (e.g., a speedometer). The vehicle mode detector 630 can compile all the vehicle parameters relevant to determining a diffuser position and determine the mode(s) of operation 650.

The method 700 can include, at Act 710, determining a position of the diffuser 205 can include one or more processors determining a position to which to move the diffuser 205. The position can be determined to minimize the drag on the vehicle 105. The position can be based on input from a sensor 185 and a mode of operation. For example, a diffuser position selector 635 can identify a position from a plurality of positions. The plurality of positions define a plurality of predefined angles at which the diffuser extends from the vehicle 105. The diffuser position selector 635 can identify an angle from the plurality of predefined angles at which the diffuser 205 is to extend away from the vehicle 105 to reduce the drag on the vehicle 105. Sweep 660 of the data repository 620 can define a plurality of predetermined angles to which the diffuser 205 can move. From the plurality of predefined angles, the diffuser position selector 635 can select an angle that is determined to reduce the drag of the vehicle 105. The selection can be based on various outputs. For example, the diffuser position selector 635 can consider any parameter of the vehicle 105 (e.g., the modes of operation determined by the vehicle mode detector 630), any input received from sensors 185 associated with the vehicle, and any combination thereof. The diffuser position selector 635 can apply the vehicle parameters to the map 665 to determine the position of the diffuser 205. For example, the map 665 can be a lookup table such that a diffuser 205 of a vehicle 105 with X, Y, and Z parameters can be disposed at Angle 1 to reduce the drag on the vehicle 105. For example, the diffuser position selector 635 can identify a speed of the vehicle 105, a ride height of the vehicle 105, and a trim package of the vehicle 105. The diffuser position selector 635 can apply the speed, ride height, and the trim package to the map 665 to determine the position of the diffuser 205. For example, the map 665 can indicate that a vehicle traveling at 50 mph, with an 8 inch ride height and the X Trim Package can reduce drag with the diffuser 205 disposed at an angle of 15 degrees from the stowed position. The map 665 can indicate a position for the diffuser 205 for any combination of parameters. In some examples, the diffuser positon selector 635 can also consider parameters not associated with the vehicle 105, including but not limited to weather conditions (e.g., temperature, humidity, precipitation, wind speed and direction, etc.), incline of road, among others.

The method 700 can include, at Act 715, determining whether to move the diffuser 205 can include identifying a current position of the diffuser 205 and comparing the current position with the determined position. For example, the determined position from the diffuser positon selector 635 can be an angle of 20 degrees. The data processing system 605 can identify the current position of the diffuser 205 to be 15 degrees. The diffuser position selector 635 can compare the determined position and the current position and determine that the positions do not match. The diffuser positon selector 635 can then determine, based on the determined position not matching the current position, that the diffuser 205 should be moved. If the diffuser positon selector 635 determined the current position was 20 degrees, the diffuser positon selector 635 can compare the two positions, determine the positions do match, and determine not to move the diffuser 205.

The method 700 can include, at act 720, transmitting a command to an actuator. For example, if the data processing system 605 determines to move the diffuser 205 to reach the determined position, of the data processing system can transmit a command to an actuator. One or more processors of the data processing system 605 can transmit the command to the actuator 210 to cause the actuator to move the diffuser 205 to the determined position. For example, the command can be to move the diffuser 205 from a first position (e.g., the current position) to a second position (e.g., the determined position), that is different from the first position. When the data processing system 605 determines not to move the diffuser 205 (e.g., the diffuser may already be at the determined position) the method 700 can end or circle back to Act 705. In some examples, method 700 can identify modes of operations and determine positions for the diffuser 205 on a continuous basis, a periodic basis, based on a time interval or responsive to a condition or event. The method 700 can be triggered by predetermined events, such as the data processing system 605 detecting a change in a mode of operation. For example, a vehicle accelerating from 25 mph to 60 mph can trigger method 700. In another example, method 700 can be triggered by the data processing system 605 receiving a signal from a sensor 185. For example, receiving a signal indicating an approaching obstacle can trigger method 700.

Figure 8:
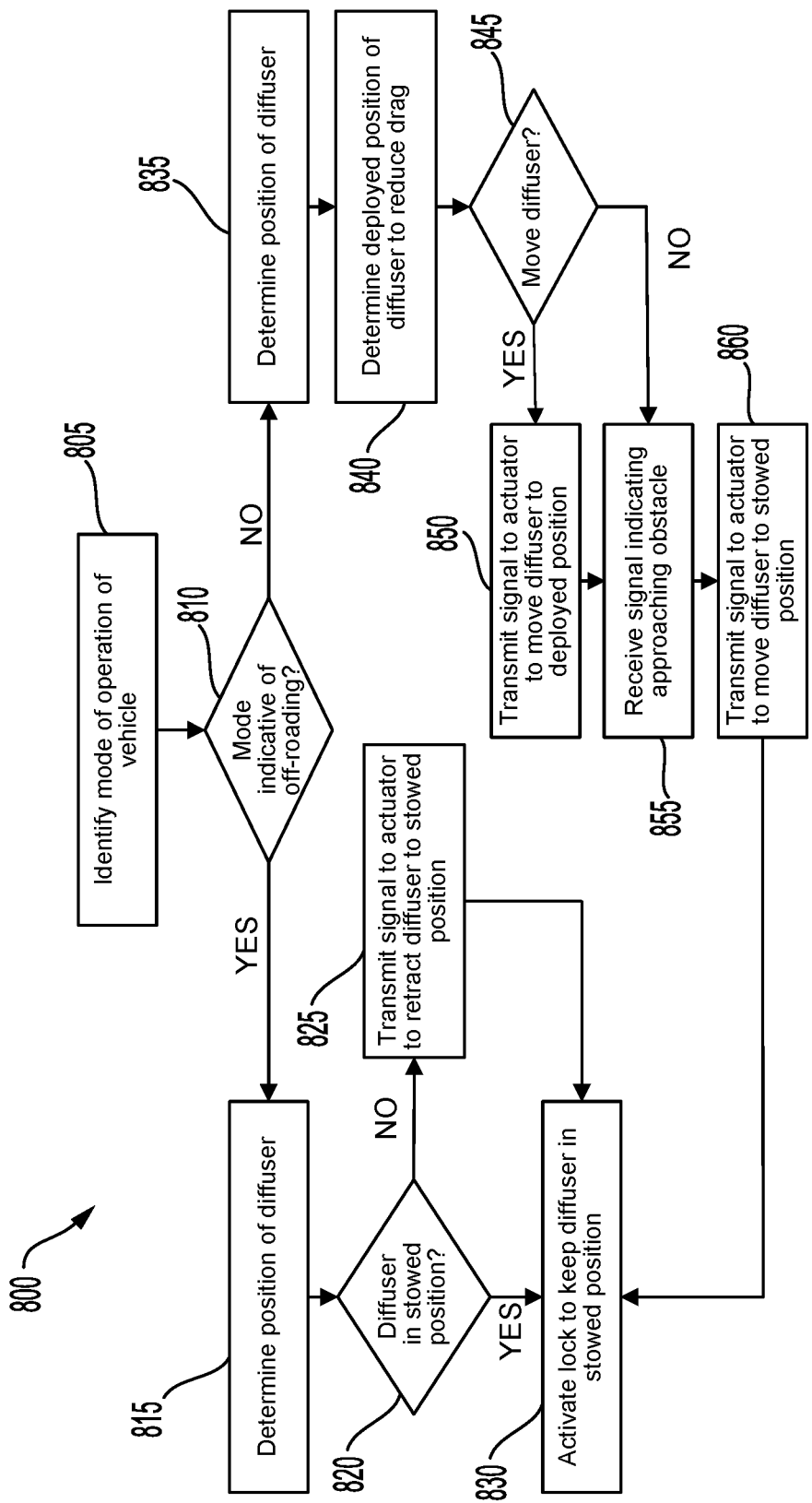
FIG. 8 is a flow diagram illustrating an example method to move a diffuser, in accordance with some aspects.

FIG. 8 depicts a flow diagram of an example method 800. Method 800 can be a method of moving a diffuser 205 to a position based on whether a vehicle 105 is in an off-roading mode and adjusting the position based on a detected obstacle. Method 800 can include identifying a mode of operation of a vehicle 805 and determining if the mode of operation is indicative of off-roading 810. If the mode is indicative of off-roading, method 800 can include determining a position of the diffuser 815 and determining whether the diffuser is in a stowed position 820. If the diffuser is not in the stowed position, method 800 can include transmitting a signal to an actuator to retract the diffuse to the stowed position 825 and activating a lock to keep the diffuser in the stored position 830. If the diffuser is in the stowed position, method 800 can jump to activating a lock to keep the diffuser in the stowed position 830. If the mode is not indicative of off-roading, method 800 can include determining a position of the diffuser 835, determining a deployed position of the diffuser, and determining whether to move the diffuser 840 to the deployed position. If the diffuser is to move to the deployed position, method 800 can include transmitting a signal to an actuator to move the diffuser to the deployed position 850, receiving a signal indicating an approaching obstacle 855, transmitting a signal to the actuator to move the diffuser to a stowed position 860, and activating a lock to keep the diffuser in a stowed position 830. If the data processing system determines not to move the diffuser to the deployed position, method 800 jump to receiving a signal indicating an approaching obstacle 855.

The method 800 can include, Act 805, identifying a mode of operation of a vehicle 105 can include one or more processors following similar steps as described with reference to FIGS. 6 and 7. The method 800 can include, at Act 810, determining whether the mode of operation is indicative of off-roading can include one or more processors identifying parameters that correspond to off-roading activities. For example, parameters that correspond to off-roading activities can include an operator of the vehicle 105 selecting to activate an off-road mode, a sensor 185 of the vehicle 105 detecting large bumps in the road (e.g., sensors that monitor the suspension of the vehicle 105), a speedometer indicating a slow speed, a sensor 185 identifying various obstacles approaching the vehicle 105, etc. These parameters, alone or in any combination, can indicate the vehicle 105 is in an off-roading mode of operation. Parameters potentially indicative of a non-off-roading mode of operation can include an operator selecting to deactivate an off-road mode, a sensor 185 detecting few bumps/smooth road, a speedometer indicating a fast speed, and a sensor 185 identifying few obstacles approaching the vehicle 105, among others. The vehicle mode detector 630 can analyze the various parameters to determine whether they indicate an off-road mode of operation.

If the mode of operation is indicative of off-roading, act 815 can include determining a current position of the diffuser 205. For example, the data processing system 605 can determine if the diffuser 205 is in a stowed position or a deployed position. When in a deployed position, the data processing system 605 can determine the position (e.g., the angle of the diffuser 205). Act 820 can include determining whether the diffuser 205 is in a stowed position. If no, act 825 of transmitting a signal to an actuator 210 to retract the diffuser 205 to the stowed position can include one or more processors generating a command causing the actuators 210 to retract the diffuser 205 responsive to entry of the vehicle into the off-road mode. For example, if the vehicle 105 is off-roading, the diffuser 205 should be stowed such that no obstacles contact and damage the deployed diffuser 205. Therefore, upon determining the vehicle 105 is off-roading and the diffuser is not in the stowed position, the command generator 645 can generate and transmit a signal to the actuator 210 to retract the diffuser 205 to the stowed position.

If the diffuser 205 was already in the stowed position, or after the diffuser is moved to the stowed position, act 830 can include activating a lock to at least temporarily prevent the diffuser from moving out of the stowed position. Again, to protect the diffuser 205 from damage during off-road excursions, the data processing system 605 can transmit a signal to a lock to keep the diffuser 205 in the stowed position at least until the vehicle 105 is no longer in the off-road mode. The lock can be a mechanical lock that physically keeps the diffuser 205 in place. In another example, the lock can be an electrical lock such that the data processing system 605 restricts power from reaching the actuators 210 configured to move the diffusers 205 or deactivates elements of the data processing system to prevent movement of the diffuser 205 (e.g., deactivates the diffuser position selector 635 or the command generator 645).

When the mode of operation of the vehicle 105 does not indicate off-roading, act 835 can include determining a current position of the diffuser 205 and act 840 can include determining a deployed position at which the diffuser would reduce drag on the vehicle 105. The method 800 can include, at Act 845, determining whether the diffuser 205 is already in the deployed position or whether to move the diffuser to be in the deployed position. For example, the diffuser position selector 635 can compare the current position with the deployed position. When the positions match, the data processing system can determine not to move the diffuser 205. When the positions do not match, the diffuser 205 can be moved to the deployed position. To move the diffuser 205 to the deployed position, act 850 can include transmitting a signal to the actuator 210 to move the diffuser to the deployed position.

If the diffuser 205 was already in the deployed position, or after the diffuser is moved to the deployed position, act 855 can include receiving a signal from a sensor 185 indicating an approaching obstacle. As described in more detail above, the obstacle can be any physical object that can contact and potentially damage the diffuser 205. The sensor 185 can detect the approaching obstacle and transmit a signal to the data processing system 605 indicating the obstacle. Responsive to receiving the signal from the sensor 185, the data processing system 605 can generate and transmit a signal to the actuator 210 to retract the diffuser 205 from the deployed position to the stored position. The data processing system 605 can detect when the diffuser 205 is in the stowed position and jump to act 830 to activate a lock to keep the diffuser 205 in the stowed position.

Figure 9:
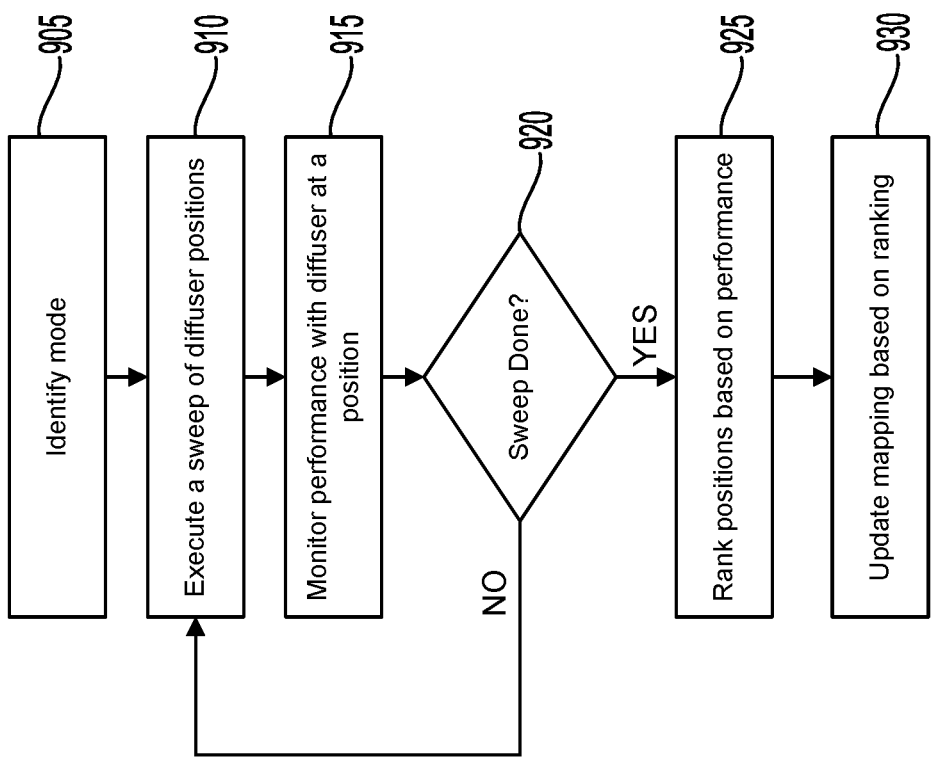
FIG. 9 is a flow diagram illustrating an example method to move a diffuser, in accordance with some aspects.

FIG. 9 depicts a flow diagram of an example method 900. Method 900 can be a method of performing a sweep in order to update mapping of parameters and diffuser positions. Method 900 can include identifying a mode of operation of a vehicle 905, executing a sweet of diffuser positions 910, monitoring performance of a vehicle with a diffuser at a position 915 and determining whether the sweep is done 920. If the sweep is not done, executing the sweep at 910 and monitoring the performance at 915 continue until the sweep is done. Once the sweep is done, method 900 can include ranking the diffuser positions based on the performance 925 and updating mapping of the diffuser positions with parameters based on the ranking 930.

The method 900 can include, at Act 905, identifying a mode of operation of a vehicle 105 according to the steps described with reference to FIGS. 6-8. For example, the vehicle mode detector 630 can identify various parameters that define a mode(s) of operation of the vehicle 105. The method 900 can include, at Act 910, executing a sweep of a plurality of diffuser positions while the vehicle 105 is in the mode(s) of operation. For example, one or more processors can transmit a command to an actuator to move the diffuser to the plurality of diffuser positions for the mode of operation of the vehicle. For example, the vehicle parameters identified to the vehicle mode detector 630 can include a speed and a ride height. During the sweep, the vehicle parameters can remain constant. In some examples, the sweep include moving the diffuser 205 to each position defined by sweep 660 (e.g., dispose the diffuser 205 at each angle of the plurality of angles defined by the sweep 660). In other examples, the sweet can include moving the diffuser 205 to a subset of the plurality of positions defined by the sweep 660. For example, map 665 can include an established position associated with the speed and ride height of the vehicle 105. In such an example, the sweep may include positions surrounding or proximate to the established position, and may exclude positions that are beyond a range or threshold angle or distance within the established position.

For example, map 665 can indicate an angle of 20 degrees for a diffuser 205 of a vehicle 105 travel at the identified speed and having the identified ride height. The map tuner 640 can determine to perform the sweep between angles proximate (e.g., plus or minus 5 degrees or 10%) to the 20 degree angle. For example, the sweep can move the diffuser 205 through a range of angles include 15 degrees to 25 degrees. The map tuner 640 can determine the range of angles and can decide the increments. For example, the diffuser can move between an angle of 15 degrees and 25 degrees in increments of 1 degree. In another example, the diffuser can move between an angle of 18 and 22 degrees in increments of 0.5 degrees.

Act 915 of monitoring performance of the vehicle 105 by one or more processors when the diffuser 205 is at each position during the sweep can include obtaining data associated with the effectiveness of the diffuser 205 in reducing the drag on a vehicle 105. For example, monitoring performance can include measuring the drag on the vehicle 105, measuring the mileage of the vehicle (e.g., miles per gallon), etc. Act 920 of determining whether the sweep is done can include determining whether vehicle performance has been monitored with the diffuser 205 at each of the plurality of positions identified by the map tuner 640. For example, when the map tuner 640 identifies six diffuser positions at which to monitor vehicle performance and the diffuser 205 has been in less than six positions, acts 910 and act 915 can be repeated until all positions have been monitored. Once the sweep is complete, act 925 of ranking the plurality of positions based on the performance of the vehicle 105 can include one or more processors generating a ranking of the plurality of positions based on the performance. For example, if the diffuser 205 at a first position reduced the drag on the vehicle more than the diffuser 205 at a second position, the first position will be ranked higher than the second position.

Upon completion of the ranking of the plurality of positions, act 930 of updating a mapping based on the ranking can include one or more processors updating a look up table with one or more of the plurality of positions based on the ranking. For example, act 930 can include comparing the top ranked position with a corresponding position in map 665. The corresponding position can be a previously identified position for the diffuser 205 for the same parameters. When the positions match, the data processing system can determine not to update the map 665. When the positions do not match, map 665 can be updated with the top ranked position. Act 930 can also include transmitting the top ranked position to remote server system 615. For example, the data processing system 605 can transmit a signal to the server system 615 via the network 610. The signal can indicate the ranking of the plurality of positions. In another example, the updated map 665 can be transmitted to the server system 615. Any updates to the map 665 can be transmitted to the server system 615 such that they can be aggregated and applied to other vehicle 105.

The processes, systems, and methods described herein can be implemented by the data processing system 605 by executing an arrangement of instructions contained in the data repository 620. Execution of the arrangement of instructions contained in data repository 620 causes the data processing system 605 to perform the illustrative processes described herein. One or more processors in a multi-processing arrangement may also be employed to execute the instructions contained in data repository 620. Hard-wired circuitry can be used in place of or in combination with software instructions together with the systems and methods described herein. Systems and methods described herein are not limited to any specific combination of hardware circuitry and software.

Although an example data processing system has been described in FIG. 6, the subject matter including the operations described in this specification can be implemented in other types of digital electronic circuitry, or in computer software, firmware, or hardware, including the structures disclosed in this specification and their structural equivalents, or in combinations of one or more of them.

Figure 10:
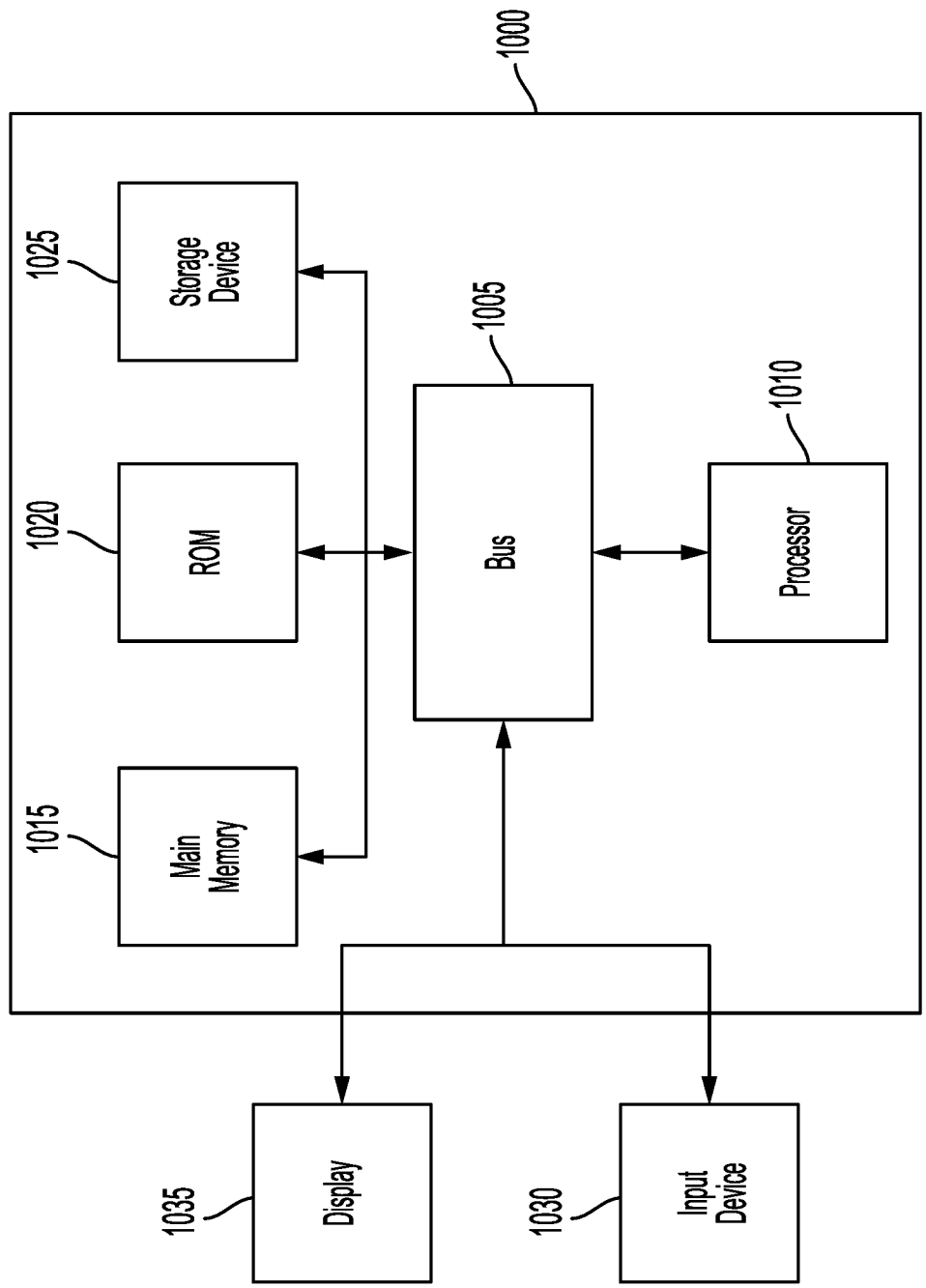
FIG. 10 is a block diagram illustrating an example architecture for a computer system that can be employed to implement elements of the systems and methods described and illustrated herein, including, for example, the system depicted in FIG. 6 and the methods depicted in FIGS. 7-9, in accordance with some aspects.

FIG. 10 depicts an example block diagram of an example computer system 1000. The computer system or computing device 1000 can include or be used to implement a data processing system (e.g., data processing system 605) or server system (e.g., server 615) or components thereof. The computing system 1000 includes at least one bus 1005 or other communication component for communicating information and at least one processor 1010 or processing circuit coupled to the bus 1005 for processing information. The computing system 1000 can also include one or more processors 1010 or processing circuits coupled to the bus for processing information. The computing system 1000 also includes at least one main memory 1015, such as a random access memory (RAM) or other dynamic storage device, coupled to the bus 1005 for storing information, and instructions to be executed by the processor 1010. The main memory 1015 can be used for storing information during execution of instructions by the processor 1010. The computing system 1000 may further include at least one read only memory (ROM) 1020 or other static storage device coupled to the bus 1005 for storing static information and instructions for the processor 1010. A storage device 1025, such as a solid state device, magnetic disk or optical disk, can be coupled to the bus 1005 to persistently store information and instructions.

The computing system 1000 may be coupled via the bus 1005 to a display 1035, such as a liquid crystal display, or active matrix display, for displaying information to a user such as a driver of the vehicle 105 or other end user. An input device 1030, such as a keyboard or voice interface may be coupled to the bus 1005 for communicating information and commands to the processor 1010. The input device 1030 can include a touch screen display 1035. The input device 1030 can also include a cursor control, such as a mouse, a trackball, or cursor direction keys, for communicating direction information and command selections to the processor 1010 and for controlling cursor movement on the display 1035.

The processes, systems and methods described herein can be implemented by the computing system 1000 in response to the processor 1010 executing an arrangement of instructions contained in main memory 1015. Such instructions can be read into main memory 1015 from another computer-readable medium, such as the storage device 1025. Execution of the arrangement of instructions contained in main memory 1015 causes the computing system 1000 to perform the illustrative processes described herein. One or more processors in a multi-processing arrangement may also be employed to execute the instructions contained in main memory 1015. Hard-wired circuitry can be used in place of or in combination with software instructions together with the systems and methods described herein. Systems and methods described herein are not limited to any specific combination of hardware circuitry and software.

Although an example computing system has been described in FIG. 10, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C #, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. Elements described as negative elements can instead be configured as positive elements and elements described as positive elements can instead by configured as negative elements. For example, elements described as having a first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein

What is claimed is:

1. A system, comprising:
a diffuser disposed at a rear portion of a vehicle, a side of the diffuser positioned to face a surface on earth located under the vehicle;
an actuator, coupled with the diffuser, configured to deploy the diffuser from a first position to a second position to adjust drag on the vehicle;
a sensor configured to detect a surrounding area of the diffuser; and
one or more processors, in communication with the sensor and the actuator, configured to:
 identify a mode of operation of the vehicle;
 transmit a command to the actuator to move the diffuser to a plurality of positions for the mode of operation of the vehicle;
 monitor performance of the vehicle at each of the plurality of positions;
 generate a ranking of the plurality of positions based on the performance;
 update a lookup table with one or more of the plurality of positions based on the ranking;

determine, based on input from the sensor, the lookup table, and the mode of operation, a position to which to move the diffuser; and
transmit a command to the actuator to cause the actuator to move the diffuser to the position determined based on the input from the sensor and the mode of operation of the vehicle.

2. The system of claim 1, wherein the plurality of positions comprise the first position and the second position, and the plurality of positions define a plurality of predetermined angles at which the diffuser extends from the vehicle based on the input from the sensor and the mode of operation.

3. The system of claim 1, wherein the mode of operation of the vehicle includes at least one of an off-road vehicle mode, a vehicle speed, a vehicle ride height, or a vehicle configuration.

4. The system of claim 1, comprising:
the plurality of positions comprising the first position and the second position, the plurality of positions defining a plurality of predetermined angles;
the one or more processors configured to:
receive, via a network, an update to the lookup table comprising a plurality of modes of operation of the vehicle and the plurality of predetermined angles; and
use the update to the lookup table to determine the position from the plurality of positions.

5. The system of claim 1, comprising the one or more processors to:
transmit the command to the actuator to generate the ranking to update the lookup table responsive to a condition; and
transmit the lookup table to a database remote from the vehicle.

6. The system of claim 1, comprising the one or more processors configured to:
identify the mode of operation of the vehicle to be an off-road mode; and
retract the diffuser responsive to entry of the vehicle into the off-road mode.

7. The system of claim 1, comprising:
the mode of operation of the vehicle is a speed of the vehicle; and
the one or more processors configured to:
identify a threshold speed;
determine the speed of the vehicle exceeds the threshold speed;
transmit the command to the actuator to move the diffuser to the position based on the speed exceeding the threshold speed, the position of the diffuser based on the speed of the vehicle.

8. The system of claim 1, wherein the position of the diffuser is configured to balance forces produced by air that moves over the vehicle with forces produced by air that moves under the vehicle.

9. The system of claim 1, comprising the one or more processors configured to provide a notification to an operator of the vehicle when the diffuser moves to the position.

10. The system of claim 1, wherein:
the sensor is configured to detect an obstacle external to the vehicle; and
the one or more processors are configured to transmit the command to the actuator to retract the diffuser to avoid the obstacle.

11. The system of claim 1, wherein the actuator is a linear actuator.

12. The system of claim 1, comprising:
the diffuser coupled with the vehicle via a hinged connection, the diffuser configured to move between the first position and the second position by rotating around the hinged connection.

13. A method, comprising:
identifying, by one or more processors, a mode of operation of a vehicle, the vehicle including a diffuser disposed at a rear portion of the vehicle, a side of the diffuser positioned to face a surface on earth located under the vehicle;
transmitting, by the one or more processors, a command to an actuator to move the diffuser to a plurality of positions for the mode of operation of the vehicle;
monitoring, by the one or more processors, performance of the vehicle at each of the plurality of positions;
generating, by the one or more processors, a ranking of the plurality of positions based on the performance;
updating, by the one or more processors, a lookup table with one or more of the plurality of positions based on the ranking;
determining, by the one or more processors, a position to which to move the diffuser, the position based on input from a sensor, the lookup table, and the mode of operation, the sensor to detect a potential obstacle for the diffuser; and
transmitting, by the one or more processors, a command to the actuator to cause the actuator to move the diffuser to the position based on the input from the sensor and the mode of operation of the vehicle.

14. The method of claim 13, wherein the plurality of positions comprise the position, and the plurality of positions define a plurality of predetermined angles at which the diffuser extends from the vehicle based on the input from the sensor and the mode of operation.

15. The method of claim 13, wherein the mode of operation of the vehicle includes at least one of an off-road mode, a vehicle speed, a vehicle ride height, or a vehicle configuration.

16. The method of claim 13, comprising:
identifying, by the one or more processors, the mode of operation of the vehicle to be an off-road mode; and
retracting, by the one or more processors, the diffuser responsive to entry of the vehicle into the off-road mode.

17. An electric vehicle, comprising:
a diffuser disposed at a rear portion of the electric vehicle, a side of the diffuser positioned to face a surface on earth located under the electric vehicle;
an actuator, coupled with the diffuser, configured to deploy the diffuser from a first position to a second position to adjust drag on the vehicle;
a sensor configured to detect a surrounding area of the diffuser; and
one or more processors, in communication with the sensor and the actuator, configured to:
identify a mode of operation of the electric vehicle;
transmit a command to the actuator to move the diffuser to a plurality of positions for the mode of operation of the vehicle;
monitor performance of the vehicle at each of the plurality of positions;
generate, based on the command to the actuator and responsive to a condition, a ranking of the plurality of positions based on the performance; and
update a lookup table with one or more of the plurality of positions based on the ranking;

transmit the lookup table to a database remote from the vehicle;

determine, based on input from the sensor and the mode of operation, a position of the plurality of positions to which to move the diffuser; and transmit a command to the actuator to cause the actuator to move the diffuser to the position determined based on the input from the sensor and the mode of operation of the electric vehicle.

18. The electric vehicle of claim 17, wherein the mode of operation of the electric vehicle includes at least one of an off-road mode, a vehicle speed, a vehicle ride height, or a vehicle configuration.

* * * * *